US010899324B2

(12) United States Patent
Yasui

(10) Patent No.: US 10,899,324 B2
(45) Date of Patent: Jan. 26, 2021

(54) BRAKING CONTROL DEVICE FOR VEHICLE

(71) Applicant: ADVICS CO., LTD., Kariya (JP)

(72) Inventor: Yoshiyuki Yasui, Nagoya (JP)

(73) Assignee: ADVICS CO., LTD., Kariya (JP)

( * ) Notice: Subject to any disclaimer, the term of this patent is extended or adjusted under 35 U.S.C. 154(b) by 206 days.

(21) Appl. No.: 16/090,771

(22) PCT Filed: Apr. 7, 2017

(86) PCT No.: PCT/JP2017/014438
§ 371 (c)(1),
(2) Date: Oct. 2, 2018

(87) PCT Pub. No.: WO2017/175848
PCT Pub. Date: Oct. 12, 2017

(65) Prior Publication Data
US 2019/0118784 A1     Apr. 25, 2019

(30) Foreign Application Priority Data

Apr. 8, 2016  (JP) .................................. 2016-077822

(51) Int. Cl.
*B60T 8/17*      (2006.01)
*B60T 8/48*      (2006.01)
*B60T 17/22*     (2006.01)
*F16D 121/24*    (2012.01)

(52) U.S. Cl.
CPC .................. *B60T 8/17* (2013.01); *B60T 8/48* (2013.01); *B60T 17/22* (2013.01); *F16D 2121/24* (2013.01)

(58) Field of Classification Search
CPC ......... B60T 13/741; B60T 17/22; B60T 8/171
See application file for complete search history.

(56) References Cited

U.S. PATENT DOCUMENTS

2011/0246039 A1*  10/2011  Takeda ................... F16D 65/18
                                                       701/70
2019/0118784 A1*   4/2019  Yasui ........................ B60T 8/48

FOREIGN PATENT DOCUMENTS

JP    2011213201 A    10/2011
JP    2015160607 A     9/2015

OTHER PUBLICATIONS

International Search Report (PCT/ISA/210) dated Jul. 4, 2017, by the Japanese Patent Office as the International Searching Authority for International Application No. PCT/JP2017/014438.

* cited by examiner

*Primary Examiner* — Thomas G Black
*Assistant Examiner* — Ana D Thomas
(74) *Attorney, Agent, or Firm* — Buchanan Ingersoll & Rooney PC

(57) ABSTRACT

A braking control device generates a force for pressing a friction member against a rotating member fixed to a wheel of the vehicle via an electric motor controlled by a controller in accordance with an operation amount of an operation member. A pressing force sensor detects a pressing force actual value, and a rotation angle sensor detects a rotation angle actual value of the motor. The controller determines whether an operating state of the pressing force sensor is appropriate. When the operating state is appropriate, the motor output is adjusted based on the pressing force actual value, a correlation between the pressing force actual value and the rotation angle actual value is stored, and a conversion calculation map is created based on the correlation. When the operating state is not appropriate, the motor output is adjusted based on the rotation angle actual value and the conversion calculation map.

2 Claims, 6 Drawing Sheets

CONVERSION CALCULATION MAP CMkt
FOR TARGET ROTATION ANGLE

CONVERSION CALCULATION MAP CFpe
FOR ESTIMATED PRESSING FORCE

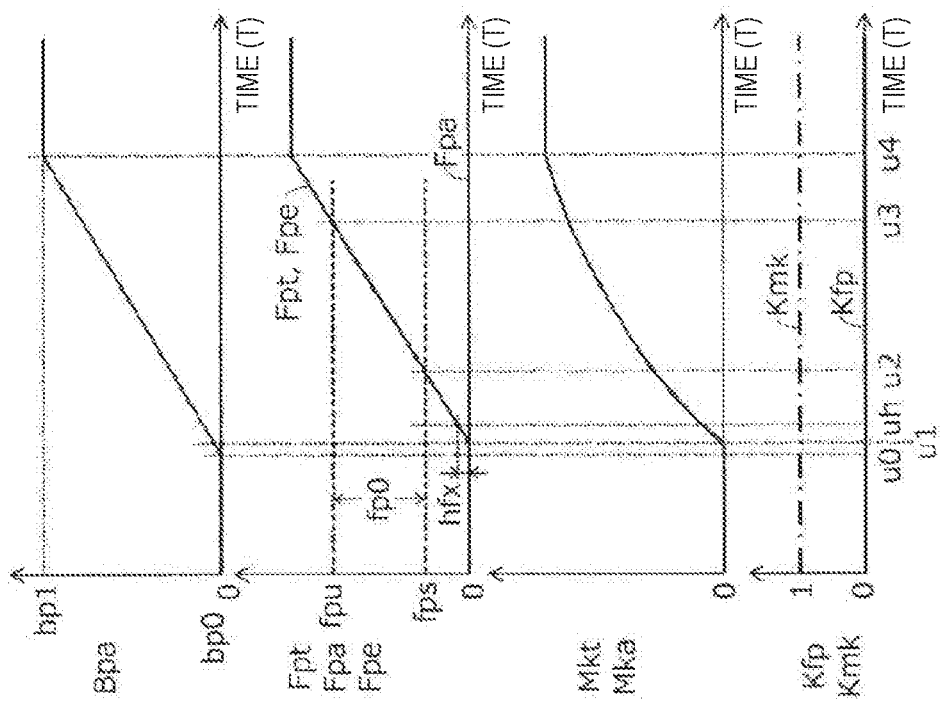
FIG. 6A CASE OF DETERMINING PRESSING FORCE SENSOR FPA BEING IN APPROPRIATE STATE
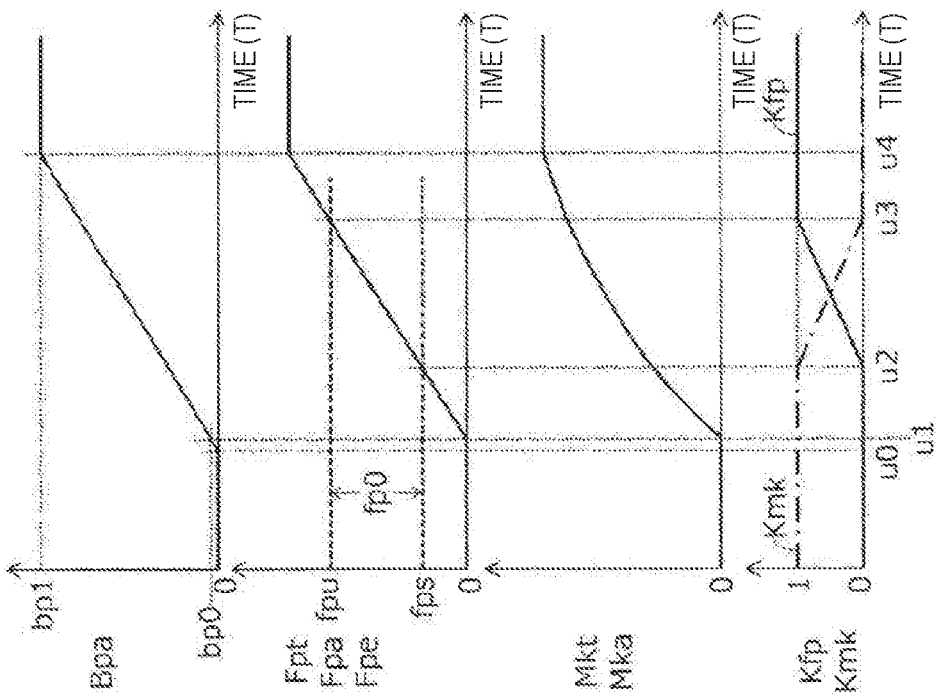
FIG. 6B CASE OF DETERMINING PRESSING FORCE SENSOR FPA BEING IN INAPPROPRIATE STATE

BRAKING CONTROL DEVICE FOR VEHICLE

TECHNICAL FIELD

The present invention relates to a braking control device for a vehicle.

BACKGROUND ART

Patent Literature 1 describes "even in a case where a rigidity table T0 stored by a RAM 31 upon starting a braking operation and an actual rigidity characteristic of an electric caliper 4 (a position-specific pressing force characteristic), which changes according to a braking circumstance such as braking intervals and braking durations, do not match, a pressing force instruction value and rotating position-specific characteristic (rigidity table) are updated each time a thrusting force estimation value is calculated in one braking" for a purpose of "providing an electric brake device capable of ensuring a braking force in accordance with an operation amount of a brake pedal". It describes that as a result, "a deviation between the pressing force instruction value and an generated pressing force can be reduced, which is in other words, followability to a pressing force instruction can be ensured according to an actual state of rigidity characteristic of the electric caliper 4".

Further, Patent Literature 1 describes that "a current-thrusting force conversion process unit 45 calculates an estimated thrusting force value being information on a thrusting force from a corrected current outputted from a current correction process unit 43. Calculation of the estimated thrusting force value by the current-thrusting force conversion process unit 45 is performed based on a motor torque constant and a mechanical efficiency of the caliper 4 obtained in advance by measurement. A thrusting force information calculation means is implemented with this current-thrusting force conversion process unit 45. The calculated estimated thrusting force value is outputted from the current-thrusting force conversion process unit 45 to a rigidity table update unit 46 and a pressing force instruction-motor rotating position instruction conversion process unit 37. The rigidity table update unit 46 generates an update rigidity table as described later using the estimated thrusting force value being the information on the thrusting force obtained by the current-thrusting force conversion process unit 45 and a corrected motor rotating position obtained by the current correction process unit 43, at a timing when the estimated thrusting force value is calculated, and changes the rigidity table being rigidity characteristic data stored in the RAM 31 to the update rigidity table". That is, the device described in Patent Literature 1 calculates a pressing force (which is also termed pushing force) is calculated based on the current.

The applicant is engaged in development of a device which performs direct detection and control instead of acquiring the pressing force (for example, a wheel cylinder fluid pressure) by estimation as described in Patent Literature 2. In order to improve controllability in a range where the pressing force is extremely low, a highly precise rigidity table (a relationship between a rotation angle of an electric motor and the pressing force, which is also called a calculation map) is necessary even in a braking control device that directly detects the pressing force. Further, when the pressing force detection means becomes faulty, an appropriate braking control must be ensured.

CITATIONS LIST

Patent Literatures

Patent Literature 1: JP 2011-213201 A
Patent Literature 2: JP 2015-160607 A

SUMMARY OF INVENTION

Technical Problems

An object of the present invention is to provide a braking control device configured to directly detect a pressing force, in which precision of a conversion calculation map between a rotation angle of an electric motor and a pressing force is improved, and an appropriate braking control can be performed even when a pressing force sensor becomes faulty.

Solutions to Problems

A braking control device for a vehicle according to the present invention is configured to generate a force for pressing a friction member (MSB) against a rotating member (KTB) fixed to a wheel of the vehicle via an electric motor (MTR) controlled by a controller (CTL) in accordance with an operation amount (Bpa) of a braking operation member (BP) of the vehicle. Further, the braking control device for a vehicle according to the present invention includes a pressing force sensor (FPA) configured to detect the pressing force as a pressing force actual value (Fpa), and a rotation angle sensor (MKA) configured to detect a rotation angle actual value (Mka) of the electric motor (MTR).

In the braking control device for a vehicle according to the present invention, the controller (CTL) is configured to determine whether or not an operating state of the pressing force sensor (FPA) is appropriate; in a case of determining that the operating state of the pressing force sensor (FPA) is appropriate, the controller is configured to adjust an output of the electric motor (MTR) based on the pressing force actual value (Fpa), store a correlation (Fpa-Mka) between the pressing force actual value (Fpa) and the rotation angle actual value (Mka), and create a conversion calculation map (CMkt, CFpe) based on the correlation (Fpa-Mka); and in a case of determining that the operating state of the pressing force sensor (FPA) is not appropriate, the controller is configured to adjust the output of the electric motor (MTR) based on the rotation angle actual value (Mka) and the conversion calculation map (CMkt).

Further, in the braking control device for a vehicle according to the present invention, the controller (CTL) is configured to calculate a pressing force estimation value (Fpe) based on the rotation angle actual value (Mka) and the conversion calculation map (CFpe), and is configured to determine whether or not the operating state of the pressing force sensor (FPA) is appropriate based on a comparison result (hFp) of the pressing force actual value (Fpa) and the pressing force estimation value (Fpe).

According to the above configuration, in a case of determining that the operating state of the pressing force sensor FPA is appropriate, the output of the electric motor MTR is finely adjusted by a pressing force feedback control based on the pressing force actual value Fpa and the relationship (Fpa-Mka characteristic) of the actual pressing force (pressing force actual value) Fpa and the actual rotation angle (rotation angle actual value) Mka is stored, and the conversion calculation maps CMkt, CFpe are created based on stored data. That is, the conversion calculation maps CMkt, CFpe are updated from old ones to latest ones. Due to this, control precision in a small-operation range in which a change in the actual pressing force Fpa is small relative to a change in the braking operation amount Bpa is improved.

Further, in the case of determining that the operating state of the pressing force sensor FPA is not appropriate, the detection value Fpa of the pressing force sensor is not employed for the control, and instead of this, the feedback control is performed based on the actual rotation angle Mka and the stored conversion calculation map CMkt to finely adjust the output of the electric motor MTR. Since the conversion calculation maps CMkt, CFpe are updated sequentially whenever the operating state of the pressing force sensor FPA was determined as being appropriate, an influence of wear in the friction member MSB is thereby compensated, and the braking control precision is ensured even when the operating state of the pressing force sensor FPA is not appropriate.

In addition, the pressing force estimation value Fpe is calculated based on the latest conversion calculation map CFpe and the determination of the appropriateness of the operating state of the pressing force sensor FPA is performed based on the comparison result (for example, a deviation hFp) of the pressing force estimation value Fpe and the pressing force actual value Fpa. As mentioned above, since the precision of the conversion calculation map CFpe is ensured, appropriate detection of sensor failures is enabled.

BRIEF DESCRIPTION OF DRAWINGS 1 is an overall configurational diagram of a vehicle mounted with a braking control device for vehicle according to the present invention.

FIGS. 6A and 6B are time series graphs for explaining workings and effects of the braking control device for vehicle according to the present invention.

DESCRIPTION OF EMBODIMENTS

Figure 1:
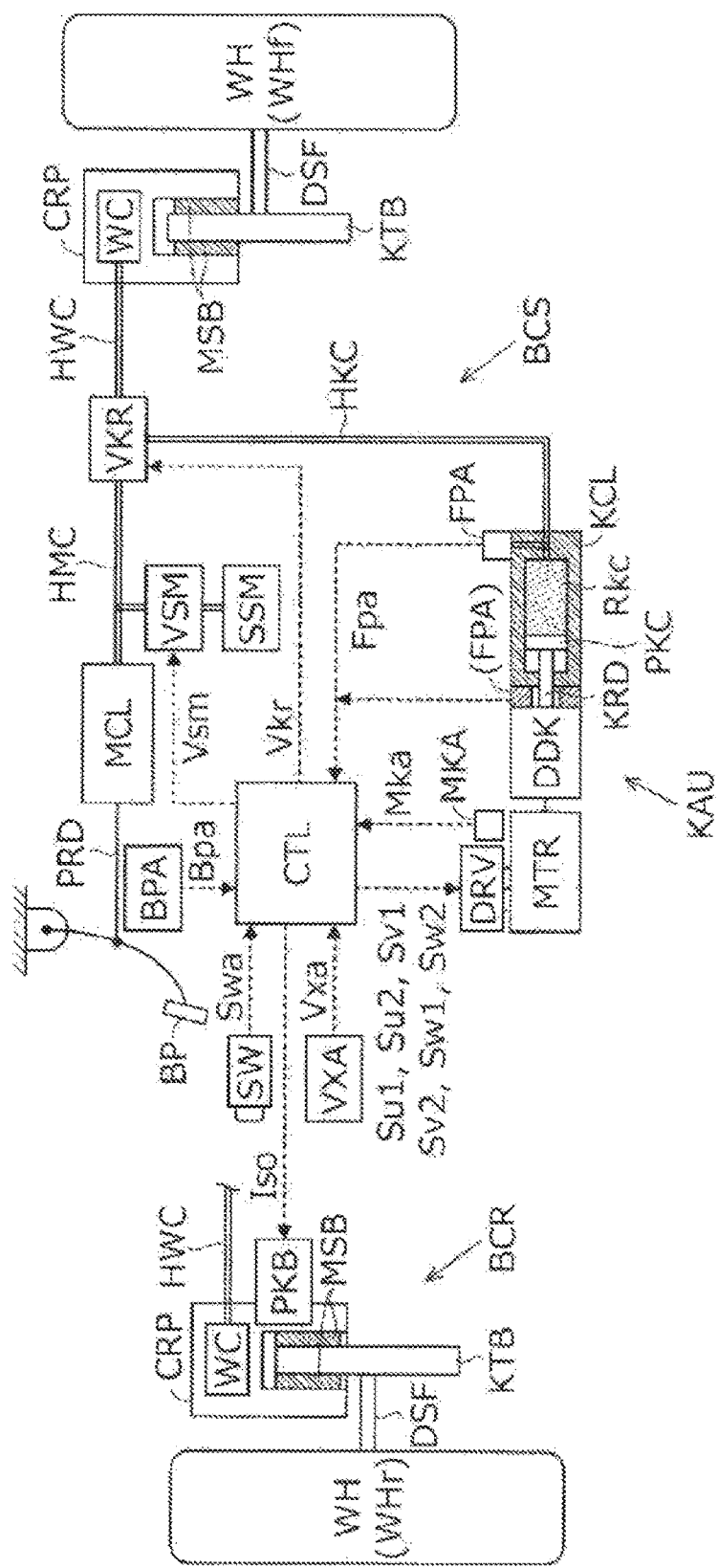

<Overall Configuration of Braking Control Device for Vehicle According to the Present Invention>

Braking control devices BCS, BCR according to the present invention will be described with reference to an overall configuration diagram of FIG. 1. Here, a difference between the braking control device BCR and the braking control device BCS is in that whether a parking brake mechanism PKB is provided or not. The braking control device BCR is provided with the parking brake mechanism PKB and the braking control device BCS is not provided with the parking brake mechanism PKB. Generally, the braking control device BCS is a device for a front wheel WHf, and the braking control device BCR is a device for a rear wheel WHr. In the following description, members, calculation processes, and signals given a same sign exhibit a same function, and overlapping explanations therefor may be omitted.

In a vehicle provided with the braking control devices BCS, BCR, a braking operation member BP, an operation amount sensor BPA, a controller CTL, a master cylinder MCL, a stroke simulator SSM, a simulator cutoff valve VSM, a pressurizing unit KAU, a switch valve VKR, a master cylinder pipe HMC, a wheel cylinder pipe HWC, and a pressurizing cylinder pipe HKC are provided. Each wheel WH of the vehicle is provided with a brake caliper CRP, a wheel cylinder WC, a rotating member KTB, and friction members MSB. Further, the vehicle is provided with a vehicle speed acquisition means VXA and a parking switch SW.

The braking operation member (for example, a brake pedal) BP is a member which a driver operates to decelerate the vehicle. When the braking operation member BP is operated, brake torque of each wheel WH is adjusted, and a braking force is generated in the wheel WH. Specifically, each of the wheels WH of the vehicle has the rotating member (for example, a brake disk) KTB fixed thereto. The brake caliper CRP is arranged to interpose the rotating member KTB therebetween. Further, the brake caliper CRP is provided with the wheel cylinder WC. A pressure of braking fluid in the wheel cylinder WC is increased, by which the friction members (for example, brake pads) MSB are pressed against the rotating member KTB. The rotating member KTB and the wheel WH are fixed via a fixation shaft DSF so as to rotate integrally. Due to this, a frictional force generated upon when the friction members MSB are pressed against the rotating member KTB generates the brake torque (braking force) in the wheel WH.

The operation amount sensor (operation amount acquisition means) BPA is provided in the braking operation member BP. An operation amount Bpa of the braking operation member BP by the driver is detected (acquired) by the operation amount sensor BPA. Specifically, as the operation amount sensor BPA, at least one of a fluid pressure sensor configured to detect a pressure in the master cylinder MCL, an operational displacement sensor configured to detect an operational displacement of the braking operation member BP, and an operational force sensor configured to detect an operational force on the braking operation member BP is employed. That is, the operation amount sensor BPA is a collective term for the master cylinder fluid pressure sensor, the operational displacement sensor, and the operational force sensor. Thus, the braking operation amount Bpa is detected and determined based on at least one of a fluid pressure of the master cylinder MCL, an operational displacement of the braking operation member BP, and an operational force of the braking operation member BP. The operation amount Bpa is inputted to the controller CTL.

The controller (which is also termed a control means) CTL is configured of an electric circuit board on which a microprocessor and the like are implemented, and a control algorithm programmed in the microprocessor. The controller CTL is configured to control the pressurizing unit KAU, the cutoff valve VSM, and the switch valve VKR to be described later based on the braking operation amount Bpa. Specifically, signals for controlling the electric motor MTR, the cutoff valve VSM, and the switch valve VKR are calculated based on a control algorithm, programmed in the controller CTL, and are outputted from the controller CTL.

When the operation amount Bpa becomes equal to or greater than a predetermined value bp0, the controller CTL outputs a drive signal Vsm for setting the cutoff valve VSM to an open position and also outputs a drive signal Vkr for the switch valve VKR to bring the pressurizing cylinder pipe HKC and the wheel cylinder pipe HWC to a communicated state. In this case, the master cylinder MCL is set in a communicated state with the simulator SSM, and the pressurizing cylinder KCL of the pressurizing unit KAU is set in a communicated state with the wheel cylinder WC. Here, the value bp0 is a preset value corresponding to a "play" of the braking operation member BP.

The controller CTL calculates drive signals (Su1, etc. to be described later) for driving the electric motor MTR based on the operation amount Bpa, a rotation angle Mka, and a pressing force Fpa, and outputs the same to a driving circuit DRV. Here, the braking operation amount Bpa is a value actually detected by the braking operation amount sensor BPA, the actual rotation angle Mka is a value actually detected by the rotation angle sensor MKA, and the actual pressing force Fpa is a value actually detected by the pressing force sensor FPA. The pressure in the braking fluid in the wheel cylinder WC is controlled (maintained, increased, or decreased) by the pressurizing unit KAU driven by the electric motor MTR.

The master cylinder MCL is connected to the braking operation member BP via a piston rod PRD. The operational force (brake pedaling force) of the braking operation member BP is converted to the pressure of the braking fluid by the master cylinder MCL. The master cylinder pipe HMC is connected to the master cylinder MCL, and when the braking operation member BP is operated, the braking fluid is discharged (pumped) from the master cylinder MCL to the master cylinder pipe HMC. The master cylinder pipe HMC is a fluid passage connecting the master cylinder MCL and the switch valve VKR.

The stroke simulator (which may simply be termed a simulator) SSM is provided to generate the operational force in the braking operation member BP. The simulator cutoff valve (which may simply be termed a cutoff valve) VSM is provided between a fluid pressure chamber in the master cylinder MCL and the simulator SSM. The cutoff valve VSM is a two-position electromagnetic valve including an open position and a closed position. When the cutoff valve VSM is in the open position, the master cylinder MCL and the simulator SSM are in a communicated state, and when the cutoff valve VSM is at the closed position, the master cylinder MCL and the simulator SSM are in a cutoff state (non-communicated state). The cutoff valve VSM is controlled by the drive signal Vsm from the controller CTL. As the cutoff valve VSM, a normally-closed electromagnetic valve (NC valve) may be employed.

A piston and an elastic body (for example, a compression spring) are provided inside the simulator SSM. The braking fluid is moved from the master cylinder MCL to the simulator SSM, and the piston is pressed by the inflowing braking fluid. A force in a direction inhibiting the inflow of the braking fluid is applied to the piston by the elastic body. The elastic body generates the operational force (for example, brake pedaling force) for the case where the braking operation member BP is operated.

<<Pressurizing Unit KAU>>

The pressurizing unit KAU discharges (pumps) the braking fluid to the pressurizing cylinder pipe HKC by using the electric motor MTR as its power source. Further, the pressurizing unit KAU presses (presses against) the friction members MSB against the rotating member KTB by the pumped braking fluid to provide the brake torque (braking force) to the wheel WH. In other words, the pressurizing unit KAU generates the force of pressing the friction members MSB against the rotating member KTB by using the electric motor MTR.

The pressurizing unit KAU is configured of the electric motor MTR, the driving circuit DRV, a power transmission mechanism DDK, a pressurizing rod KRD, a pressurizing cylinder KCL, a pressurizing piston PKC, and the pressing force sensor FPA.

The electric motor MTR is the power source for the pressurizing cylinder KCL (which is a part of the pressurizing unit KAU) to adjust the pressure (increase or reduce pressure) of the braking fluid in the wheel cylinder WC. For example, as the electric motor MTR, a three-phase brushless motor may be employed. The electric motor MTR includes three coils CLU, CLV, CLW and is driven by the driving circuit DRV. The electric motor MTR is provided with the rotation angle sensor (rotation angle acquisition means) MKA for detecting (acquiring) a rotor position (rotation angle) Mka of the electric motor MTR. The rotation angle Mka is inputted to the controller CTL.

The driving circuit DRV is an electric circuit board in which switching elements (power semiconductor devices) for driving the electric motor MTR are mounted. Specifically, a bridge circuit BRG is formed on the driving circuit DRV, and an electric conduction state to the electric motor MTR is controlled based on the drive signals (Su1, etc.). The driving circuit DRV is provided with an electric conduction amount acquisition means (current sensor) IMA for acquiring (detecting) an actual electric conduction amount (electric conduction amount to each phase) Ima to the electric motor MTR. The electric conduction amount (detection value) Ima of each phase is inputted to the controller CTL.

The power transmission mechanism DDK decelerates rotary power of the electric motor MTR, converts the same to linear power, and outputs it to the pressurizing rod KRD. Specifically, the power transmission mechanism DDK is provided with a reduction gear (not illustrated), and the rotary power from the electric motor MTR is decelerated and outputted to a screw member (not illustrated). Then, the rotary power is converted to the linear power for the pressurizing rod KRD by the screw member. That is, the power transmission mechanism DDK is a rotary-linear conversion mechanism.

The pressurizing rod KRD has the pressurizing piston PKC fixed thereto. The pressurizing piston PKC is inserted to an inner hole of the pressurizing cylinder KCL, and a combination of a piston and a cylinder is thereby formed. Specifically, a seal member (not illustrated) is provided on an outer periphery of the pressurizing piston PKC, and fluid sealing performance is ensured with the inner hole (inner wall) of the pressurizing cylinder KCL. That is, a fluid chamber Rkc (which will be termed a "pressurizing chamber Rkc") which is defined by the pressurizing cylinder KCL and the pressurizing piston PKC, and in which the braking fluid is filled, is thereby formed.

In the pressurizing cylinder KCL, a volume of the pressurizing chamber Rkc is changed by the pressurizing piston PKC being moved in a center axis direction. By this volume change, the braking fluid is moved between the pressurizing cylinder KCL and the wheel cylinder WC through the braking pipes (pipes) HKC, HWC. The fluid pressure in each wheel cylinder WC is adjusted by input and output of the braking fluid into and from the pressurizing cylinder KCL, as a result of which the force by which the friction members MSB press the rotating member KTB (pressing force) is adjusted.

For example, as the pressing force sensor FPA, a fluid pressure sensor configured to acquire (detect) a fluid pressure Fpa of the pressurizing chamber Rkc is provided in the pressurizing unit KAU (especially the pressurizing cylinder KCL). The fluid pressure sensor (corresponding to the pressing force sensor) FPA is fixed to the pressurizing cylinder KCL, and is configured integrally with the pressurizing unit KAU. A detection value Fpa of the pressing force (that is, the fluid pressure in the pressurizing chamber Rkc) is inputted to the controller (control means) CTL. As above, the pressurizing unit KAU has been explained.

The switch valve VKR switches a state in which the wheel cylinder WC is connected to the master cylinder MCL and a state in which the wheel cylinder WC is connected to the pressurizing cylinder KCL. The switch valve VKR is controlled based on the drive signal Vkr from the controller CTL. Specifically, when a braking operation is not being performed (Bpa<bp0), the wheel cylinder pipe HWC is in the communicated state with the master cylinder pipe HMC through the switch valve VKR, and is in the non-communicated (cutoff) state with the pressurizing cylinder pipe HKC. Here, the wheel cylinder pipe HWC is a passage connected to the wheel cylinder WC. When the braking operation is performed (that is, when a state of Bpa≥bp0 is realized), the switch valve VKR is excited based on the drive signal Vkr, the communication between the wheel cylinder pipe HWC and the master cylinder pipe HMC is cut off, and the wheel cylinder pipe HWC and the pressurizing cylinder pipe HKC are set to be in the communicated state.

The brake caliper (which may simply be termed a caliper) CRP is provided in the wheel WH, provides the brake torque to the wheel WH, and causes the braking force to be generated therein. As the caliper CRP, a floating type caliper may be employed. The caliper CRP is configured to interpose the rotating member (for example, a brake disk) KTB between two friction members (for example, brake pads) MSB. The wheel cylinder WC is provided in the caliper CRP. The fluid pressure in the wheel cylinder WC is adjusted, by which the piston in the wheel cylinder WC is moved (advances or retreats) relative to the rotating member KTB. This movement of the piston presses the friction members MSB against the rotating member KTB, and the pressing force Fpa is thereby generated.

The vehicle speed acquisition means VXA acquires a traveling speed Vxa of the vehicle. The vehicle speed Vxa is calculated based on an output revolution speed of a gearbox or a change in a vehicle position detected by a global positioning system. Further, the vehicle speed Vxa is calculated based on a detection result (wheel speed) of a wheel speed sensor VWA (not shown) provided in the wheel WH. Further, a result (traveling speed) Vxa calculated in another device may be acquired through a communication bus. Thus, the vehicle speed acquisition means VXA is a collective term for the aforementioned acquisition means (wheel speed sensor VWA, etc.). The vehicle speed Vxa is inputted to the controller CTL.

A switch for parking brake (which may simply be termed a parking switch) SW is a switch operated by the driver, and outputs an on or off signal (parking signal) Swa to the controller CTL. That is, the driver instructs to actuate or release the parking brake for maintaining a stopped state of the vehicle by operation on the parking switch SW. Specifically, actuation of the parking brake is instructed with an on (ON) state of the parking signal Swa, and release of the parking brake is instructed with an off (OFF) state of the parking signal Swa. The parking signal Swa is inputted to the controller CTL.

The braking control device BCR is provided with the parking brake mechanism PKB. The parking brake mechanism (which may also be termed a lock mechanism) PKB is a braking function (a so-called parking brake) for maintaining a stopped state of the vehicle, so it is configured to lock movement of the electric motor MTR so as not to rotate in a reverse direction. The lock mechanism PKB constrains (restricts) the friction members MSB from moving in a direction separating away from the rotating member KTB, by which a pressed state of the rotating member KTB by the friction members MSB is maintained. As the lock mechanism PKB, a ratchet mechanism (a mechanism which restricts an operating direction to a single direction) may be employed. Further, a self-locking screw mechanism (that is, having a "0" reversed efficiency), a worm gear, and the like may be employed.

The lock mechanism PKB is omitted in the braking control device BCS. The wheel on which the braking control device BCS not provided with the lock mechanism PKB will be termed a "free wheel". Further, the wheel on which the braking control device BCR provided with the lock mechanism PKB will be termed a "constrained wheel". In a general vehicle, the front wheel WHf is the free wheel, and the rear wheel WHr is the constrained wheel.

FIG. 1 exemplifies a configuration of a disk type brake device (disk brake). In this case, the friction members MSB are brake pads, and the rotating member KTB is a brake disk. Instead of the disk type brake device, a drum type brake device (drum brake) may be employed. In a case of the drum brake, a brake drum is employed instead of the caliper CRP. Further, the friction members MSB are brake shoes and the rotating member KTB is the brake drum.

Further in FIG. 1, the output of the electric motor MTR is converted to the force by which the friction members MSB press the rotating member KTB (pressing force) via the braking fluid, however, a configuration in which the friction members MSB press the rotating member KTB directly without intervention of the braking fluid may be employed. In this configuration, the pressurizing unit KAU is directly fixed to the caliper CRP instead of the wheel cylinder WC. Further, the friction members MSB are pressed against the rotating member KTB by the pressurizing piston PKC of the pressurizing unit KAU. The pressing force sensor FPA (the pressing force sensor FPA with a round parentheses) is arranged between the power transmission mechanism DDK (for example, the reduction gear, the screw mechanism) and the pressurizing cylinder KCL so as to acquire the actual pressing force Fpa. In this configuration, the braking fluid is not used, so the pressurizing chamber Rkc is not formed.

<Processes in Controller CTL>

With reference to a functional block diagram in FIG. 2, processes in the controller (control means) CTL will be described. Here, an example in which the brushless motor is employed as the electric motor MTR will be described.

The controller CTL calculates signals Su1, Su2, Sv1, Sv2, Sw1, Sw2 (which may simply be termed "Su1 to Sw2") for driving switching elements SU1, SU2, SV1, SV2, SW1, SW2 (which may simply be termed "SU1 to SW2") of the driving circuit DRV to be described later. The controller CTL is configured of a target pressing force calculation block FPT, an instruction electric conduction amount calculation block IMS, an analog-digital conversion process block ADH, a pressing force feedback control block FFB, a conversion calculation block HNK, a rotation angle feedback control block MFB, a appropriateness determination block HNT, a composite compensation electric conduction amount calculation block IGH, a parking electric conduction amount calculation block IPK, a target electric conduction amount calculation block IMT, and a switching control block SWT.

In the target pressing force calculation block FPT, a target pressing force Fpt is calculated based on the braking operation amount Bpa and a calculation characteristic (calculation map) CFpt. Here, the target pressing force Fpt is a target value of the fluid pressure (corresponding to the pressing force) generated by the pressurizing unit KAU. Specifically, in the calculation characteristic CFpt, the target pressing force Fpt is calculated as "0 (zero)" in a range where the braking operation amount Bpa is equal to or greater than "0 (zero, corresponding to a case where the braking operation is not being performed)" to less than a predetermined value bp0, and the target pressing force Fpt is calculated to increase monotonically from zero according to an increase in the operation amount Bpa when the operation amount Bpa is equal to or greater than the predetermined value bp0. Here, the predetermined value bp0 is a value corresponding to the "play" of the braking operation member BP.

In the instruction electric conduction amount calculation block IMS, an instruction electric conduction amount Ims for the electric motor MTR driving the pressurizing unit KAU (a target value of the electric conduction amount for controlling the electric motor MTR) is calculated based on the target pressing force Fpt and preset calculation characteristics (calculation maps) CIup, CIdw. The calculation map for the instruction electric conduction amount Ims is configured of two characteristics by taking into account an influence of hysteresis by the power transmission mechanism DDK and the like, namely the characteristic CIup for a case where the target pressing force Fpt increases and the characteristic CIdw for a case where the target pressing force Fpt decreases.

Here, the "electric conduction amount" is a state quantity (state variable) for controlling the output torque of the electric motor MTR. Since the electric motor MTR outputs the torque that is substantially proportional to current, a current target value of the electric motor MTR may be used as the target value (target electric conduction amount) of the electric conduction amount. Further, since the current increases as a result of increasing a supplied voltage to the electric motor MTR, a supplied voltage value may be used as the target electric conduction amount. Moreover, since the supplied voltage value may be modulated by a duty ratio in pulse width modulation, this duty ratio (ratio of electrically conducting time in a cycle) may be used as the electric conduction amount.

In a case where an analog type sensor is employed as the pressing force sensor FPA, a detection result (analog value) of the pressing force sensor FPA is converted to a digital value in the analog-digital conversion process block ADH. That is, in the analog-digital conversion process block ADH, a so-called analog-digital conversion (which is also called an AD conversion) is performed. The converted actual pressing force Fpa is read by the controller CTL. In so doing, a resolution of the pressing force Fpa (least significant bit, LSB: Least Significant Bit) is determined according to a bit number of the conversion means ADH. For example, in a case where the analog-digital conversion process block ADH is 10 bit, an output of the pressing force sensor FPA is taken into the controller CTL as a digital value divided by 2 to the power of ten in a dynamic range thereof.

<<Pressing Force Feedback Control Block FFB>>

In the pressing force feedback control block FFB, a target value of the pressing force (for example, target fluid pressure) Fpt and an actual value of the pressing force (detection value) Fpa are used as state variables of control, and a compensation electric conduction amount Ifp of the electric motor MTR is calculated based thereon. An error may in some cases occur in the pressing force by a mere control based on the instruction electric conduction amount Ims. Due to this, the pressing force feedback control block FFB calculates a compensation electric conduction amount for compensating this error and finely adjusting the output of the electric motor MTR. The pressing force feedback control block FFB is configured of a comparison calculation and a pressing force compensation electric conduction amount calculation block IPF.

The comparison calculation compares the target value Fpt and the actual value Fpa of the pressing force. Here, the actual value Fpa of the pressing force is a detection value acquired (detected) by the pressing force sensor FPA (for example, fluid pressure sensor). In the comparison calculation, a deviation (pressing force deviation) eFp of the target pressing force (target value) Fpt and the actual pressing force (detection value) Fpa is calculated. The pressing force deviation eFp (which is a control variable, and is "pressure" in terms of physical quantity) is inputted to the pressing force compensation electric conduction amount calculation block IPF.

The pressing force compensation electric conduction amount calculation block IPF includes a proportional element block, a differentiating element block, and an integrating element block. In the proportional element block, a proportional gain Kpp is multiplied to the pressing force deviation eFp to calculate a proportional element of the pressing force deviation eFp. In the differentiating element block, the pressing force deviation eFp is differentiated, to which a differential gain Kpd is multiplied to calculate a differentiating element of the pressing force deviation eFp. In the integrating element block, the pressing force deviation eFp is integrated, to which an integrating gain Kpi is multiplied to calculate an integrating element of the pressing force deviation eFp. Then, the pressing force compensation electric conduction amount Ifp is calculated by adding the proportional element, the differentiating element, and the integrating element. That is, in the pressing force compensation electric conduction amount calculation block IPF, a so-called PID control feedback loop based on the pressing force is formed based on a comparison result eFp of the target pressing force Fpt and the actual pressing force Fpa so that the actual pressing force (detection value) Fpa matches the target pressing force (target value) Fpt of the pressing force (that is, the deviation eFp approaches "0 (zero)"). Due to this, the output of the electric motor MTR is adjusted. The pressing force feedback control block FFB has been described above.

In the conversion calculation block HNK, conversion from the pressing force to the rotation angle and conversion from the rotation angle to the pressing force are performed based on the correlation of the pressing force by the pressurizing unit KAU and the rotation angle of the electric motor MTR. This is due to the output of the electric motor MTR being converted to the output of the pressurizing unit KAU by known specifications and the like of the power transmission mechanism DDK.

In the conversion calculation block HNK, the target rotation angle Mkt is calculated based on the target pressing force Fpt and the conversion calculation characteristic (conversion calculation map) CMkt. Here, the target rotation angle Mkt is a target value of the rotation angle of the electric motor MTR. Specifically, it is calculated so that it increases monotonically with an "upwardly convex" characteristic from "0 (zero)" accompanying an increase in the target pressing force Fpt, according to the conversion calculation map CMkt for the target rotation angle Mkt. The target rotation angle Mkt is calculated as a value corresponding to the target pressing force Fpt. The calculation characteristic CMkt for the target rotation angle Mkt is set based on rigidities (spring constants) of the caliper CRP, the friction members MSB, and the like, and specifications of the wheel cylinder WC and the pressurizing cylinder KCL (pressure receiving areas), and the like, and is successively updated by a method described later based thereon.

In the conversion calculation block HNK, an estimated pressing force Fpe is calculated based on the actual rotation angle Mka and the conversion calculation map CFpe. Here, the estimated pressing force Fpe is an estimation value for the pressing force converted from the detection value Mka of the rotation angle in the electric motor MTR. Specifically, it is calculated so that it increases monotonically with a "downwardly convex" characteristic from "0 (zero)" accompanying an increase in the actual rotation angle Mka, according to the conversion calculation map CFpe for the estimated pressing force Fpe. Similar to the conversion calculation map CMkt for the target rotation angle Mkt, the conversion calculation characteristic CFpe for the estimated pressing force Fpe is set based on the rigidities (spring constants) of the caliper CRP, the friction members MSB, and the like, and the specifications of the wheel cylinder WC and the pressurizing cylinder KCL (pressure receiving areas), and the like, and is successively updated based thereon.

The conversion calculation block HNK includes an approximation function calculation block KNJ. In the approximation function calculation block KNJ, approximation functions (approximation functions Knj, Kni, etc.) that approximate a correlation (Fpa-Mka characteristic) of the actual pressing force Fpa and the actual rotation angle Mka are calculated based on the actual pressing force Fpa and the actual rotation angle Mka. The conversion calculation maps CMkt, CFpe are created based on the approximation functions Knj, Kni, and are updated from old conversion calculation maps from the past to latest ones. Here, the approximation function Knj (target rotation angle map CMkt) and the approximation function Kni (estimated pressing force map CFpe) are in a relationship of inverse functions. Processes in the approximation function calculation block KNJ will be described later.

<<Rotation Angle Feedback Control Block MFB>>

In the rotation angle feedback control block MFB, the rotation angle target value (target rotation angle) Mkt and the rotation angle actual value (detection value) Mka are used as state variables of the control, and an compensation electric conduction amount Imk of the electric motor MTR is calculated based thereon. Since a pressing pressure and a motor rotation angle have correlated relationship through the rigidity of the caliper CRP and the like and the dimension of the pressurizing cylinder KCL and the like, the rotation angle feedback control block MFB complements the pressing force feedback control. That is, the rotation angle feedback control block MFB calculates a compensation electric conduction amount for finely adjusting the output of the electric motor MTR, similar to the pressing force feedback control block FFB. The rotation angle feedback control block MFB is configured of a comparison calculation and a rotation angle compensation electric conduction amount calculation block IMK.

The comparison calculation compares the target value (target rotation angle) Mkt and the actual value (detection value) Mka of the rotation angle of the electric motor MTR. Here, the actual value Mka of the rotation angle is a detection value of the rotation angle (actual rotation angle) acquired (detected) by the rotation angle sensor MKA. For example, in the comparison calculation, a deviation (rotation angle deviation) eMk of the target rotation angle (target value) Mkt and the actual rotation angle (detection value) Mka is calculated. The rotation angle deviation eMk (control variable) is inputted to the rotation angle compensation electric conduction amount calculation block IMK.

The rotation angle compensation electric conduction amount calculation block IMK includes a proportional element block, a differentiating element block, and an integrating element block. In the proportional element block, a proportional gain Kmp is multiplied to the rotation angle deviation eMk to calculate a proportional element of the rotation angle deviation eMk. In the differentiating element block, the rotation angle deviation eMk is differentiated, to which a differential gain Kmd is multiplied to calculate a differentiating element of the rotation angle deviation eMk. In the integrating element block, the rotation angle deviation eMk is integrated, to which an integrating gain Kmi is multiplied to calculate an integrating element of the rotation angle deviation eMk. Then, the rotation angle compensation electric conduction amount Imk is calculated by adding the proportional element, the differentiating element, and the integrating element. That is, in the rotation angle compensation electric conduction amount calculation block IMK, a so-called PID control feedback loop based on the rotation angle is formed based on a comparison result eMk of the target rotation angle Mkt and the actual rotation angle Mka so that the actual rotation angle (detection value) Mka matches the target rotation angle (target value) Mkt (that is, the deviation eMk approaches "0 (zero)"). Due to this, the output of the electric motor MTR is adjusted. The rotation angle feedback control block MFB has been described above.

In the appropriateness determination block HNT, a determination is made on "being appropriate or not" regarding the detection signal (pressing force actual value) Fpa of the pressing force sensor FPA. In a case where the actual pressing force Fpa is appropriate (that is, a case where the pressing force sensor FPA is appropriately actuated), "0 (zero)" is outputted as a determination result (determination flag) Hnt, and in a case where the actual pressing force Fpa is not appropriate (that is, a case where the pressing force sensor FPA is not appropriately actuated), "1" is outputted as the determination flag Hnt.

The determination on whether the pressing force sensor FPA is appropriate is performed based on a comparison of the estimation value (estimated pressing force) Fpe that converted the actual rotation angle Mka to the pressing force and the actual value Fpa of the pressing force. Firstly, the actual rotation angle Mka is converted to the estimated pressing force Fpe based on the conversion calculation characteristic CFpe to be described later. The deviation hFp (absolute value) between the actual pressing force Fpa and the estimated pressing force Fpe is calculated, and "Hnt=0 (affirmative appropriateness determination)" is outputted in a case where the deviation hFp is less than a predetermined value hfx. On the other hand, in a case where the deviation hFp is equal to or greater than the predetermined value hfx, "Hnt=1 (negative appropriateness determination)" is outputted. Here, a threshold hfx used in the appropriateness determination is set to a value that is less than a lower value (predetermined value) fps to be described later.

<<Composite Compensation Electric Conduction Amount Calculation Block IGH>>

In the composite compensation electric conduction amount calculation block IGH, the pressing force compensation electric conduction amount Ifp and the rotation angle compensation electric conduction amount Imk are composed to calculate a composite compensation electric conduction amount Igh, which is a final compensation electric conduction amount. As described above, the pressing force compensation electric conduction amount Ifp and the rotation angle compensation electric conduction amount Imk are correlated. Due to this, the pressing force compensation electric conduction amount Ifp is adjusted by a pressing force coefficient Kfp and the rotation angle compensation electric conduction amount Imk is adjusted by a rotation angle coefficient Kmk, as a result of which the composite compensation electric conduction amount Igh is calculated.

Moreover, in the composite compensation electric conduction amount calculation block IGH, the composite compensation electric conduction amount Igh is determined based on the determination result (determination flag indicating the propriety) Hnt in the appropriateness determination block HNT. Firstly, a case where the determination flag Hnt indicates that "the pressing force sensor FPA is appropriate (Hnt=0)" will be described.

In the composite compensation electric conduction amount calculation block IGH, a pressing force coefficient Kfp for correcting the pressing force compensation electric conduction amount Ifp is calculated based on the target pressing force Fpt, and a calculation characteristic (calculation map) CKfp of the pressing force coefficient. Specifically, in a range where the target pressing force Fpt is equal to or greater than "0 (zero)" and less than a lower value fps (under a condition of "0≤Fpt<fps"), the pressing force coefficient Kfp is calculated to "0 (zero)". In a range where the target pressing force Fpt is equal to or greater than the lower value fps and less than an upper value fpu (under a condition of "fps≤Fpt<fpu"), the pressing force coefficient Kfp is calculated to increase monotonically from "0" to "1" according to an increase in the target pressing force Fpt. Further, in a case where the target pressing force Fpt is equal to or greater than the upper value fpu (under a condition of "Fpt≥fpu"), the pressing force coefficient Kfp is calculated to "1". Here, the lower value fps and the upper value fpu are preset predetermined values (thresholds), and the upper value fpu is a value that is equal to or greater than the lower value fps. For example, the upper value fpu may be set as a value that is greater than the lower value fps by a predetermined value fp0 for smooth transition of the pressing force feedback control (for example, transition from control prohibition to control execution).

Similarly, in the composite compensation electric conduction amount calculation block IGH, a rotation angle coefficient Kmk for correcting the rotation angle compensation electric conduction amount Imk is calculated based on the target pressing force Fpt and a calculation characteristic (calculation map) CKmk of the rotation angle coefficient. Specifically, in the range where the target pressing force Fpt is equal to or greater than "0 (zero)" and less than the lower value fps (under the condition of "0≤Fpt<fps"), the rotation angle coefficient Kmk is calculated to "1". In the range where the target pressing force Fpt is equal to or greater than the lower value fps and less than the upper value fpu (under the condition of "fps≤Fpt<fpu"), the rotation angle coefficient Kmk is calculated to decrease monotonically from "1" to "0" according to the increase in the target pressing force Fpt. Further, in the case where the target pressing force Fpt is equal to or greater than the upper value fpu (under the condition of "Fpt≥fpu"), the rotation angle coefficient Kmk is calculated to "0 (zero)". Similar to the above, the lower value fps and the upper value fpu are the preset predetermined values (thresholds), and the upper value fpu is a value that is equal to or greater than the lower value fps (the lower value fps is a value that is equal to or less than the upper value fpu). For example, the upper value fpu may be set as the value that is greater than the lower value fps by the predetermined value fp0 for smooth transition of the rotation angle feedback control (for example, transition from control execution to control prohibition). Here, a relationship of the pressing force coefficient Kfp and the rotation angle coefficient Kmk is set to a total of "1" (Kfp+Kmk=1).

Further, in the composite compensation electric conduction amount calculation block IGH, the pressing force compensation electric conduction amount Ifp and the rotation angle compensation electric conduction amount Imk are composed based on the pressing force coefficient Kfp and the rotation angle coefficient Kmk to calculate the composite compensation electric conduction amount Igh as a final result. That is, in the calculation of the composite compensation electric conduction amount, a degree of influence (which is also called a contribution) of the pressing force compensation electric conduction amount Ifp is taken into account by the pressing force coefficient Kfp, and a degree of influence of the rotation angle compensation electric conduction amount Imk is taken into account by the rotation angle coefficient Kmk. Specifically, the composite compensation electric conduction amount Igh is calculated by adding "a value in which the pressing force coefficient (degree of influence of pressing force) Kfp is multiplied to the pressing force compensation electric conduction amount Ifp" and "a value in which the rotation angle coefficient (degree of influence of rotation angle) Kmk is multiplied to the rotation angle compensation electric conduction amount Imk" (Igh=(Kfp·Ifp)+(Kmk·Imk)). For example, in a case of "Kfp=0.3, Kmk=0.7", the degree of influence of the pressing force compensation electric conduction amount Ifp is 30%, and the degree of influence of the rotation angle compensation electric conduction amount Imk is 70% in the composite compensation electric conduction amount Igh.

In the case where the target pressing force Fpt is small and "0≤Fpt<fps" is satisfied, "Kfp=0, Kmk=1 (the degree of contribution of the rotation angle compensation electric conduction amount Imk being 100%)" are calculated, so the pressing force compensation electric conduction amount Ifp is not employed in the calculation of the composite compensation electric conduction amount Igh and only the rotation angle compensation electric conduction amount Imk is employed therein. In the feedback control, the degree of contribution of the actual pressing force Fpa is set to zero, and the degree of contribution becomes fully that of the rotation angle Mka. That is, the pressing force feedback control is prohibited and only the rotation angle feedback control is executed.

In the case where the target pressing force Fpt becomes relatively large and "fps≤Fpt<fpu" is satisfied, the rotation angle coefficient Kmk is calculated by being decreased from "1" and the pressing force coefficient Kfp is calculated by being increased from "0" according to the increase in the target pressing force Fpt. Due to this, the composite compensation electric conduction amount Igh is calculated with the degrees of influence of the rotation angle compensation electric conduction amount Imk (that is, the rotation angle Mka) and the pressing force compensation electric conduction amount Ifp (that is, the actual pressing force Fpa) being taken into account using the weighing coefficients Kfp, Kmk. That is, both the pressing force feedback control and the rotation angle feedback control are executed.

In the case where the target pressing force Fpt is relatively large and "Fpt≥fpu" is satisfied, "Kfp=1, Kmk=0 (the degree of contribution of the pressing force compensation electric conduction amount Ifp being 100%)" are calculated, so the rotation angle compensation electric conduction amount Imk is not employed in the calculation of the composite compensation electric conduction amount Igh and only the pressing force compensation electric conduction amount Ifp is employed therein. In the feedback control, the degree of contribution of the rotation angle Mka is set to zero, and the degree of contribution becomes fully that of the actual pressing force Fpa. That is, the rotation angle feedback control is prohibited and only the pressing force feedback control is executed.

As above, the two feedback control loops are adjusted based on the target pressing force Fpt, and only the feedback control loop related to the pressing force (brake fluid pressure) is enabled when the target pressing force Fpt is large to ensure a matching accuracy of magnitudes of the pressing force. On the other hand, when the target pressing force Fpt is small, only the feedback control loop related to the rotation angle is enabled, and the detected pressing force Fpa is not employed in the feedback control. Due to this, a smooth control with a high resolution of pressing force can be executed. In addition, since the coefficients Kfp, Kmk are gradually changed according to the changes in the target pressing force Fpt, so a mutual transition of the two feedback controls can take place smoothly.

Next, a case where the determination flag Hnt indicates that "the pressing force sensor FPA is not appropriate (Hnt=1)" will be described. In the case where the pressing force sensor FPA is not actuated appropriately, the pressing force coefficient Kfp is calculated to "0 (zero)" based on a calculation characteristic (calculation map) CKfn of the pressing force coefficient. Further, the rotation angle coefficient Kmk is calculated to "1" based on a calculation characteristic (calculation map) CKmn of the rotation angle coefficient. That is, in the case where the pressing force sensor FPA is not functioning appropriately, the pressing force compensation electric conduction amount Ifp is not employed in the calculation of the composite compensation electric conduction amount Igh, and the rotation angle compensation electric conduction amount Imk is outputted as it is as the composite compensation electric conduction amount Igh. In other words, the pressing force feedback control is prohibited and only the rotation angle feedback control is executed.

Since the target pressing force Fpt is calculated based on the braking operation amount Bpa, the braking operation amount Bpa may be employed instead of the target pressing force Fpt in the characteristics for calculating the respective coefficients Kfp, Kmk. Here, the braking operation amount Bpa and the target pressing force Fpt may each be termed an "operation amount corresponding value". That is, the coefficients Kfp, Kmk are calculated based on the operation amount corresponding values. The composite compensation electric conduction amount calculation block IGH has been described above.

In the parking electric conduction amount calculation block IPK, a parking electric conduction amount Ipk (an electric conduction amount for the electric motor MTR) and a solenoid electric conduction instruction Iso (electric conduction signal for a solenoid SOL) for controlling the parking brake are calculated based on the vehicle speed Vxa, the parking signal Swa, the actual pressing force Fpa, and the actual motor rotation angle Mka. The parking electric conduction amount Ipk is a target value of the electric conduction amount of the electric motor MTR for a parking brake control, and is inputted to the target electric conduction amount calculation block IMT. Further, the solenoid actuator (which may simply be termed a solenoid) SOL is driven by the solenoid electric conduction instruction Iso.

In the parking electric conduction amount calculation block IPK, a time counter (timer) is started at a time when the parking signal Swa from the parking switch SW transitions from off to on after the vehicle has stopped (in a corresponding calculation cycle). Then, the parking electric conduction amount Ipk is outputted at a preset pattern based on a time elapsed since starting of the time counter. Specifically, the stop of the vehicle is determined based on the vehicle speed Vxa. Then, the parking electric conduction amount Ipk is outputted so as to exhibit an increase by a time gradient kz0 and reaching an upper limit value ipm with the time when the time counter was started as zero (starting point). Here, the upper limit value ipm is set so that the pressing force fpk required for maintaining the stopped state of the vehicle (requested value of the parking brake) can surely be achieved by taking power transmission efficiency of the brake actuator BRK into account.

When the pressing force Fpa reaches the requested value fpk of the parking brake by the parking electric conduction amount Ipk, the solenoid actuator SOL is excited based on the solenoid electric conduction instruction Iso, and a ratchet gear RCH is engaged with an engagement pawl TSU.

The lock mechanism PKB is provided on the constrained wheel (for example, the rear wheel WHr). The lock mechanism PKB is configured of the ratchet gear RCH, the solenoid SOL, and the engagement pawl TSU. The ratchet gear RCH rotates in synchrony with the electric motor MTR. For example, the electric motor MTR and the ratchet gear RCH are fixed coaxially, and rotated integrally. The engagement pawl TSU can engage with the ratchet gear RCH, and is moved by the solenoid SOL. Specifically, when the solenoid SOL is excited by the solenoid electric conduction instruction Iso, the engagement pawl TSU is pressed out toward the ratchet gear RCH by the solenoid SOL. Due to this, the engagement pawl TSU and the ratchet gear RCH are engaged. Unlike normal gear teeth, the ratchet gear RCH has teeth (so-called sawtooth shaped), and a directionality of rotation is given by angles of these teeth. With the engagement pawl TSU and the ratchet gear RCH being engaged, the state in which the friction members MSB press the rotating member KTB is maintained even when electric conduction of the electric motor MTR and the solenoid SOL is stopped, by which state in which the parking brake is effective is maintained.

From the parking electric conduction amount calculation block IPK, when the parking switch SW is shifted from off to on, the controller CTL increases not only the pressing force of the constrained wheel but also the pressing force of the free wheel. That is, upon starting to actuate the parking brake, the output of the electric motor MTR for entirety of the pressurizing unit KAU including the free wheel is increased. The increase in the pressing force upon the start of the actuation of the parking brake is for creating the conversion calculation maps CMkt, CFpe (to be described later) that also comply with the free wheel.

In the target electric conduction amount calculation block IMT, the target electric conduction amount Imt, which is the final target value of the electric conduction amount, is calculated based on the instruction electric conduction amount (target value) Ims, the composite compensation electric conduction amount Igh, and the parking electric conduction amount Ipk. Specifically, in the case where the actuation of the parking brake is not instructed (the parking signal Swa being off and Ipk=0), the composite compensation electric conduction amount Igh is added to the instruction electric conduction amount Ims, and a sum thereof is calculated as the target electric conduction amount Imt (that is, Imt=Ims+Igh). That is, the target electric conduction amount Imt is determined so that the output of the electric motor MTR is adjusted by the composite compensation electric conduction amount Igh which is based on the feedback control.

In the case where the actuation of the parking brake is instructed, the instruction electric conduction amount Ims and the parking electric conduction amount Ipk are compared, and larger one of them is calculated as the target electric conduction amount Imt. In this case, the composite compensation electric conduction amount Igh is set to "0 (zero)" (that is, the compensation by the feedback control is not performed).

In the case where the determination flag Hnt indicates that "the pressing force sensor FPA is not appropriate (Hnt=1)", "Igh=Imk" is established, so the target electric conduction amount calculation block IMT calculates the target electric conduction amount Imt, which is the final target value of the electric conduction amount, based on the instruction electric conduction amount (target value) Ims, the rotation angle compensation electric conduction amount Imk, and the parking electric conduction amount Ipk. In the case where the parking brake is not instructed (the parking signal Swa being off and Ipk=0), the rotation angle compensation electric conduction amount Imk is added to the instruction electric conduction amount Ims, and a sum thereof is calculated as the target electric conduction amount Imt (that is, Imt=Ims+Imk). In the case where the parking brake is instructed, the instruction electric conduction amount Ims and the parking electric conduction amount Ipk are compared, and the larger one of them is calculated as the target electric conduction amount Imt, similar to the case of "Hnt=0". In this case, the rotation angle compensation electric conduction amount Imk is set to "0 (zero)".

In the target electric conduction amount calculation block IMT, a sign of the target electric conduction amount Imt (a value thereof being positive or negative) is determined based on a direction in which the electric motor MTR is to rotate (that is, increasing or decreasing direction of the pressing force). Further, a magnitude of the target electric conduction amount Imt is calculated based on rotary power which the electric motor MTR is to output (that is, increasing or decreasing amount of the pressing force). Specifically, the sign of the target electric conduction amount Imt is calculated as a positive sign (Imt>0) in a case of increasing the brake pressure, and the electric motor MTR is driven in a forward direction. On the other hand, the sign of the target electric conduction amount Imt is determined as a negative sign (Imt<0) in a case of decreasing the brake pressure, and the electric motor MTR is driven in a reverse direction. Further, the output torque (rotary power) of the electric motor MTR is controlled to be larger when an absolute value of the target electric conduction amount Imt is larger, and the output torque is controlled to be smaller when the absolute value of the target electric conduction amount Imt is smaller.

In the switching control block SWT, drive signals Su1 to Sw2 for performing pulse width modulation of the respective switching elements SU1 to SW2 are calculated based on the target electric conduction amount Imt. In the case where the electric motor MTR is a brushless motor, target values Jut, Ivt, Iwt of electric conduction amounts of the respective phases (U phase, V phase, and W phase) are calculated based on the target electric conduction amount Imt and the rotation angle Mka. Duty ratios Dut, Dvt, Dwt of pulse widths of the respective phases (ratio of an on-period in one cycle) are determined based on the target electric conduction amounts Jut, Ivt, Iwt of the respective phases. Then, the drive signals Su1 to Sw2 that determine whether the respective switching elements SU1 to SW2 configuring the bridge circuit BRG are to be in an on-state (electrically conducted state) or an off-state (electrically non-conducted state) are calculated based on the duty ratios (target values) Dut, Dvt, Dwt. The drive signals Su1 to Sw2 are outputted to the driving circuit DRV.

The six drive signals Su1 to Sw2 individually control electrically conducted and non-conducted states of the six switching elements SU1 to SW2. Here, a conduction time per unit time is made longer in each switching element when the duty ratio thereof is larger, and larger current is flown in a coil thereof. Thus, rotary power of the electric motor MTR is made large.

The driving circuit DRV is provided with the electric conduction amount acquisition means (for example, current sensor) IMA for each phase, and the actual electric conduction amount (total of respective phases) Ima is acquired (detected) thereby. The detection value (for example, actual current value) Ima of each phase is inputted to the switching control block SWT. Then, a so-called current feedback control is performed so that the detection value Ima of the respective phases match the target values Jut, Ivt, Iwt. Specifically, in the respective phases, the duty ratios Dut, Dvt, Dwt are modified (finely adjusted) based on deviations between the actual electric conduction amount Ima and the target electric conduction amounts Jut, Ivt, Iwt. A high-precision motor control can be achieved by this current feedback control.

<Three-Phase Brushless Motor MTR and Driving Circuit DRV Thereof>

Figure 3:
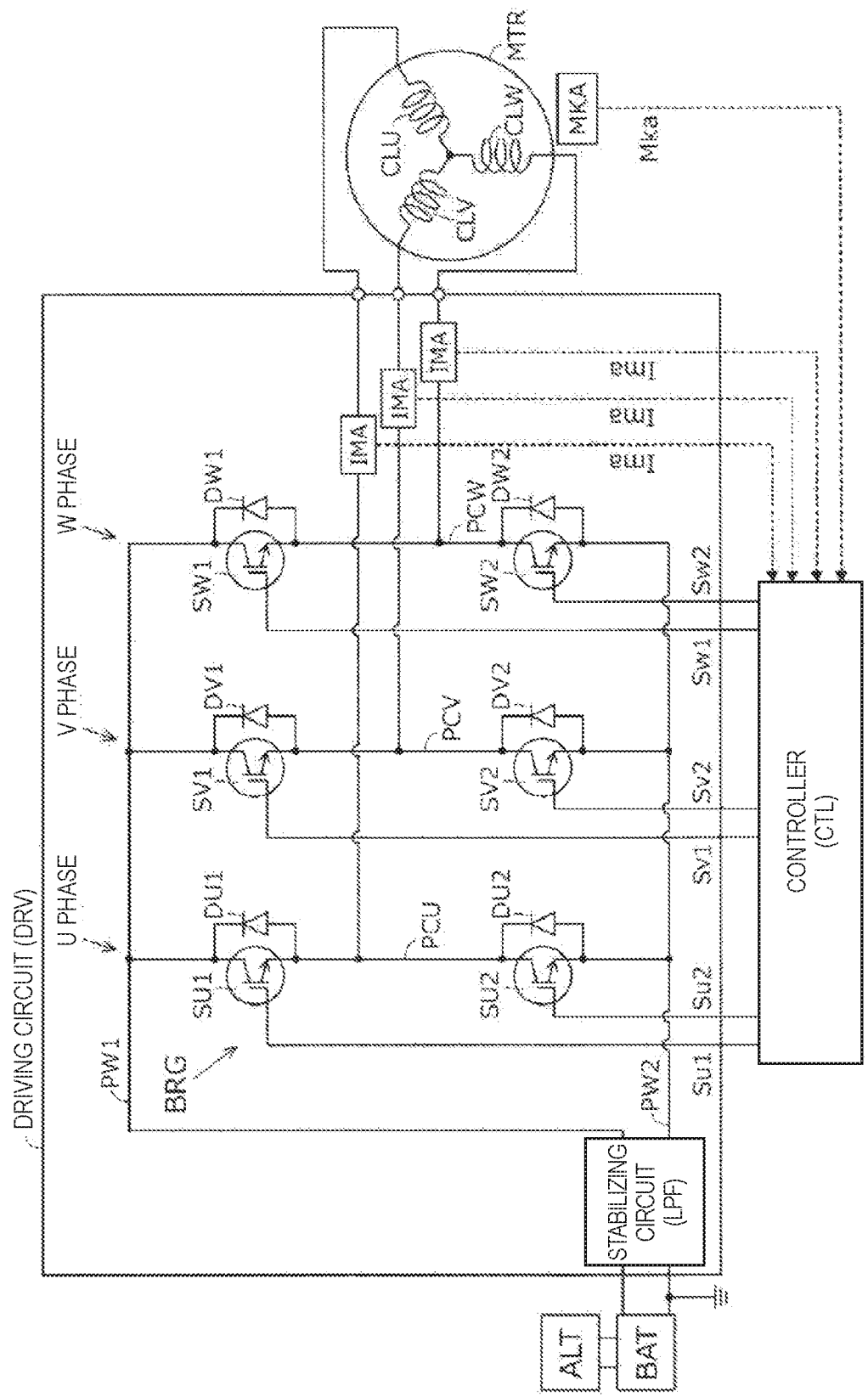
FIG. 3 is a circuit diagram for explaining an electric motor and a driving circuit thereof.

The example in which the three-phase brushless motor including three coils (wirings), namely the U-phase coil CLU, the V-phase coil CLV, and the W-phase coil CLW is employed as the electric motor MTR will be described with reference to a circuit diagram of FIG. 3. In the brushless motor MTR, magnets are arranged on a rotor (rotor) side, and wiring circuits (coils) are arranged on a stator (stator) side. The electric motor MTR commutates by the driving circuit DRV at timings matching magnetic poles of the rotor, and is driven to rotate.

The electric motor MTR is provided with the rotation angle sensor MKA configured to detect the rotation angle (rotor position) Mka of the electric motor MTR. As the rotation angle sensor MKA, a Hall element type is employed. Further, as the rotation angle sensor MKA, a variable reluctance type resolver may be employed. The detected rotation angle Mka is inputted to the controller CTL.

The driving circuit DRV is an electric circuit configured to drive the electric motor MTR. The electric motor MTR is driven by the driving circuit DRV based on the drive signals Su1, Su2, Sv1, Sv2, Sw1, Sw2 (which may be denoted as "Su1 to Sw2") for the respective phases from the controller CTL. The driving circuit DRV is configured of the three-phase bridge circuit formed by the six switching elements (power transistors) SU1, SU2, SV1, SV2, SW1, SW2

(which may be denoted as "SU1 to SW2") (which may simply be termed bridge circuit) BRG and a stabilizing circuit LPF.

The rechargeable battery BAT is connected to an input side of the three-phase bridge circuit (which may be termed an inverter circuit) BRG via the stabilizing circuit LPF, and the electric motor MTR is connected to an output side of the bridge circuit BRG. In the bridge circuit BRG, a voltage type bridge circuit having an upper and lower arm configuration connecting the switching elements in serial is used for one phase, by which the three phases (U phase, V phase, and W phase) are configured. Upper arms of the three phases are connected to a power line PW1 connected to a positive electrode side of the rechargeable battery BAT. Further, lower arms of the three phases are connected to a power line PW2 connected to a negative electrode side of the rechargeable battery BAT. In the bridge circuit BRG, the upper and lower arms of the respective phases are connected to the power lines PW1, PW2 in parallel to the rechargeable battery BAT.

The U-phase upper arm has a freewheel diode DU1 connected in inverse parallel to the switching element SU1, and the U-phase lower arm has a freewheel diode DU2 connected in inverse parallel to the switching element SU2. Similarly, the V-phase upper arm has a freewheel diode DV1 connected in inverse parallel to the switching element SV1, and the V-phase lower arm has a freewheel diode DV2 connected in inverse parallel to the switching element SV2. Further, the W-phase upper arm has a freewheel diode DW1 connected in inverse parallel to the switching element SW1, and the W-phase lower arm has a freewheel diode DW2 connected in inverse parallel to the switching element SW2. Connecting portions PCU, PCV, PCW of the upper and lower arms of the respective phases form output terminals (alternating current output terminals) of the bridge circuit BRG. These output terminals have the electric motor MTR connected thereto.

The six switching elements SU1 to SW2 are elements that can turn on or turn off a part of the electric circuit. For example, as the switching elements SU1 to SW2, MOS-FETs and IGBTs may be employed. In the brushless motor MTR, the switching elements SU1 to SW2 configuring the bridge circuit BRG are controlled based on the rotation angle (rotor position) Mka. Further, directions of the electric conduction amounts (that is, excitation directions) of the coils CLU, CLV, CLW of the respective three phases (U phase, V phase, W phase) are switched sequentially, by which the electric motor MTR is driven to rotate. That is, a rotation direction (forward or reverse direction) of the brushless motor MTR is determined by a relationship between the rotor and a position where magnetic excitation takes place. Here, the forward direction of the electric motor MTR is a rotation direction corresponding to the increase in the pressing force Fpa by the pressurizing unit KAU, and the reverse direction of the electric motor MTR is a rotation direction corresponding to the decrease in the pressing force Fpa.

The electric conduction amount acquisition means IMA for detecting the actual electric conduction amount Ima (collective term for the respective phases) between the bridge circuit BRG and the electric motor MTR is provided for each of the three phases. For example, a current sensor is provided as the electric conduction amount acquisition means IMA, and the current value is detected as the actual electric conduction amount Ima. The detected electric conduction amount Ima of each phase is inputted to the controller (control means) CTL.

The driving circuit DRV receives power supply from a power source (rechargeable battery BAT, generator ALT). To reduce fluctuation in supplied power (voltage), the driving circuit DRV is provided with the stabilizing circuit (which may also be termed a noise reduction circuit) LPF. The stabilizing circuit LPF is configured by a combination of at least one condenser (capacitor) and at least one inductor (coil), and is a so-called LC circuit (which may also be termed a LC filter).

As the electric motor MTR, a motor with brush (which may simply be termed a brush motor) may be employed, instead of a brushless motor. In this case, an H bridge circuit configured of four switching elements (power transistors) is used as the bridge circuit BRG. That is, in the bridge circuit BRG of the brush motor, one of the three phases in the brushless motor is omitted. Similar to the case of the brushless motor, the electric motor MTR is provided with the rotation angle sensor MKA, and the driving circuit DRV is provided with the stabilizing circuit LPF. Moreover, the driving circuit DRV is provided with the electric conduction amount sensor IMA.

<Processes in Appropriateness Determination Block and Creation Processes of Conversion Calculation Maps>

Figure 4:
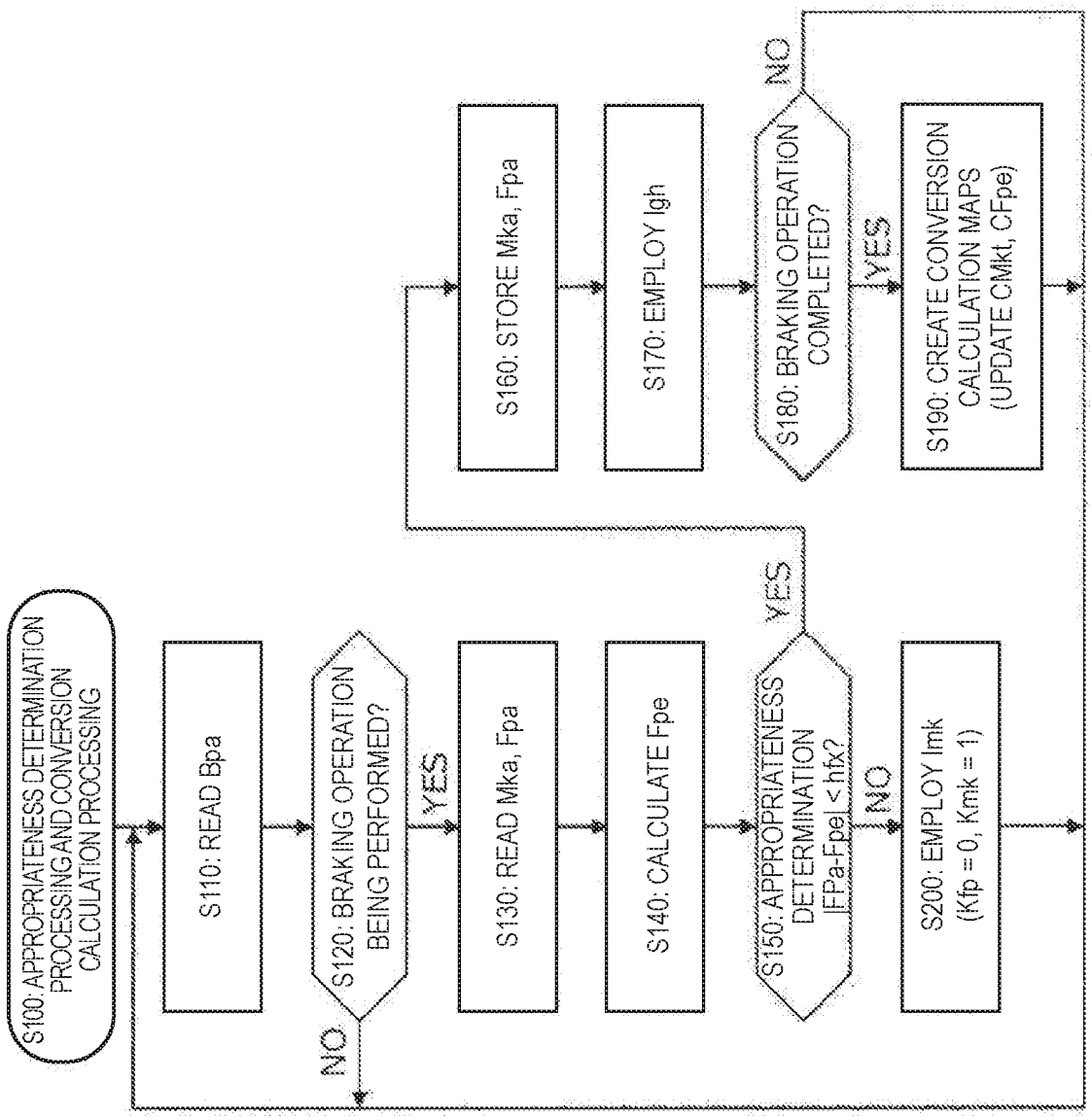
FIG. 4 is a flow diagram for explaining processes in an appropriateness determination block and processes in a conversion calculation block.

Processes in the appropriateness determination block HNT and processes in the conversion calculation block HNK (especially creation processes of the conversion calculation maps CMkt, CFpe) will be described with reference to a flow diagram of FIG. 4.

Firstly, the braking operation amount Bpa is read in step S110. Next, the process proceeds to step S120. In step S120, a determination is made on "whether braking is being executed or not" based on the braking operation amount Bpa. Specifically, "the braking is being executed" is determined in a case where the braking operation amount Bpa is equal to or greater than the predetermined value bp0. Further, "the braking is not executed (non-braking)" is determined in a case where the braking operation amount Bpa is less than the predetermined value bp0. In a case where "the braking is being executed" is affirmed in step S120 (a case of "YES"), the process proceeds to step S130. On the other hand, in a case where "the braking is being executed" is denied in step S120 (a case of non-braking and "NO"), the process returns to step S110. Here, the predetermined value bp0 is a value corresponding to the "play" of the braking operation member BP.

The determination in step S120 may be performed based on a signal of a stop switch provided in the braking operation member BP. The determination of braking is made in a case where the stop switch signal is on, and the determination of not braking is made in a case where the stop switch signal is off. A calculation cycle in which the determination of step S120 is determined affirmatively for the first time will be termed "start of the braking operation". That is, in a situation where a state of "not performing braking operation" is continuing, a time point when the "braking operation is being performed" is the start of the braking operation.

In step S130, the actual rotation angle (rotation angle actual value) Mka and the actual pressing force (pressing force actual value) Fpa are read. The process proceeds to step S140. In step S140, the estimated pressing force (pressing force estimation value) Fpe is calculated based on the actual rotation angle Mka and the conversion calculation map CFpe. The estimated pressing force Fpe is a value corresponding to the actual pressing force Fpa and estimated from the actual rotation angle Mka.

In step S150, "whether the actual pressing force Fpa is appropriate or not" is determined based on the comparison of the estimated pressing force Fpe and the actual pressing force Fpa. For example, the appropriateness determination of the actual pressing force Fpa is performed based on "whether or not the absolute value of the deviation hFp of the actual pressing force Fpa and the estimated pressing force Fpe is less than the predetermined value (appropriateness determination value) hfx". The process proceeds to step S160 in a case where the absolute value of the deviation hFp is less than the predetermined value hfx and the appropriateness determination condition is affirmed (case of "YES"). On the other hand, in a case where the absolute value of the deviation hFp is equal to or greater than the predetermined value hfx and the appropriateness determination condition is denied (case of "NO"), the process proceeds to step S200. The predetermined value hfx is the threshold for the appropriateness determination, and is a value smaller than the lower value fps.

In step S160, the actual rotation angle Mka and the actual pressing force Fpa are synchronized and stored. That is, since the actual pressing force Fpa has been determined as being appropriate, the actual rotation angle Mka and the actual pressing force Fpa in the calculation cycle are stored in a memory of a microprocessor for creating the conversion calculation maps CMkt, CFpe. The process proceeds to step S170.

Figure 2:
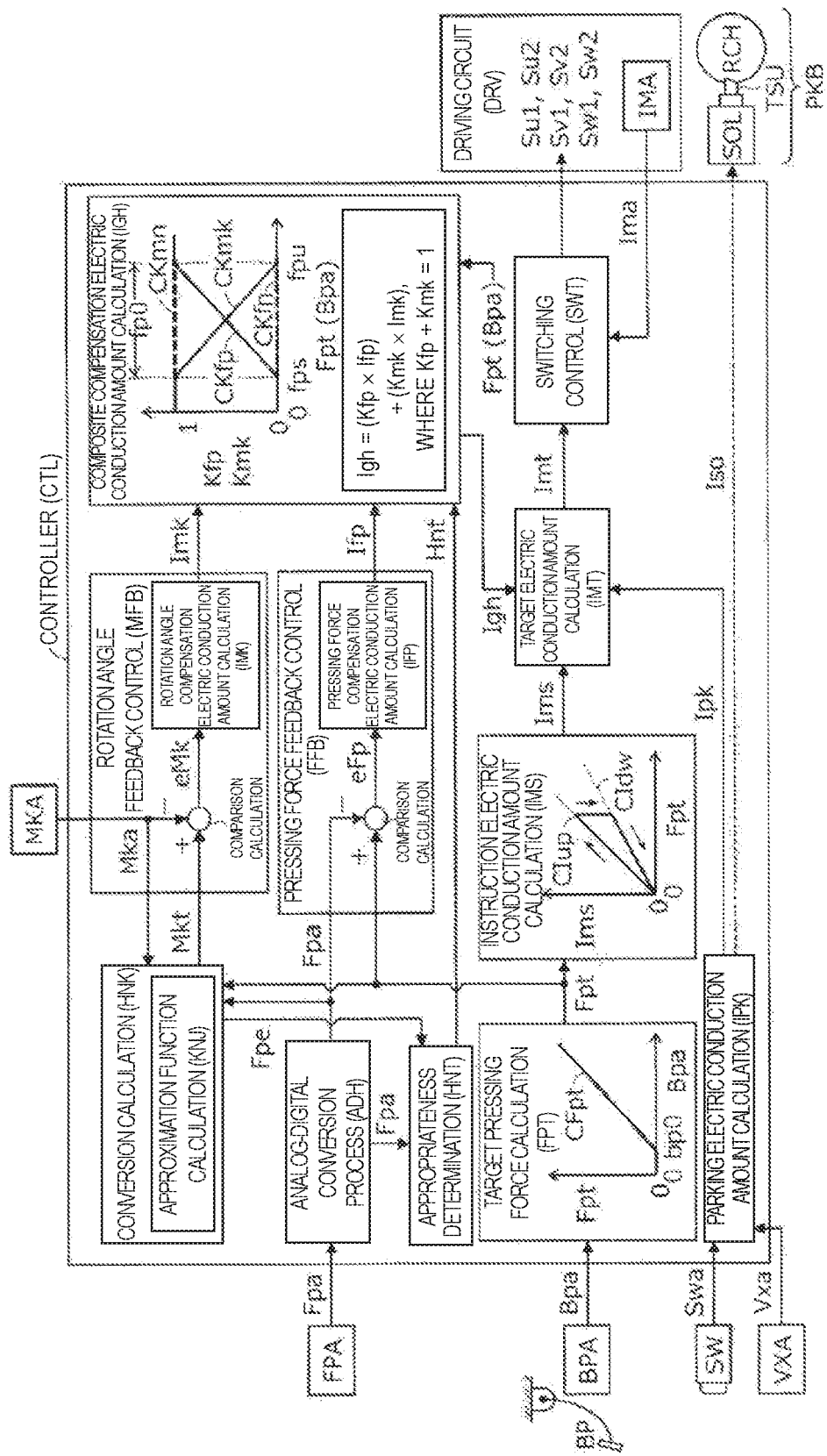
FIG. 2 is a functional block diagram for explaining processes in a controller.

In step S170, the composite compensation electric conduction amount Igh is calculated as aforementioned, and is outputted from the composite compensation electric conduction amount calculation block IGH to the target electric conduction amount calculation block IMT (see FIG. 2). That is, the normal feedback control for the case where the actual pressing force Fpa is in an appropriate state is performed.

In step S180, "whether or not the braking operation that has been continuing since the start of the braking operation has been completed" is determined based on the braking operation amount Bpa. Specifically, the completion of the braking operation is determined based on "whether or not the braking operation amount Bpa is less than a releasing-side predetermined value bps". Here, the releasing-side predetermined value bps is a value smaller than a stepping-side predetermined value bp0. In a case where the braking operation amount Bpa is less than the predetermined value bps and the determination condition for the completion of the braking operation is satisfied (a case of "YES"), the process proceeds to step S190. In a case where the braking operation amount Bpa is equal to or greater than the predetermined value bps and the determination condition for the completion of the braking operation is denied (a case where the braking operation is still continuing, and "NO"), the process returns to step S110.

Similar to the determination in step S120, the determination of step S180 may be performed based on a signal of the stop switch provided in the braking operation member BP. The determination of the braking being continued is made in a case where the stop switch signal is on, and the determination of the braking being completed is made in a case where the stop switch signal is off.

In step S190, the conversion calculation maps CMkt, CFpe are created based on data arrays of the actual rotation angle Mka and the actual pressing force Fpa that were synchronized and stored. That is, the data of the actual rotation angle Mka and the actual pressing force Fpa that were stored in a series of braking operation that continued from the start of the braking operation to the completion thereof is processed after the completion of the braking operation, by which the conversion calculation maps CMkt, CFpe are newly created. Further, the conversion calculation maps CMkt, CFpe from the past are replaced with the new conversion calculation maps CMkt, CFpe.

In step S200, since the pressing force sensor FPA is not appropriate, "Kfp=0, Kmk=1" are employed, by which the composite compensation electric conduction amount Igh is determined. That is, the pressing force feedback control is prohibited and only the rotation angle feedback control is executed, and the rotation angle compensation electric conduction amount Imk is outputted as the composite compensation electric conduction amount Igh. The process of step S200 is the feedback control for a case where the signal of the actual pressing force Fpa is in an inappropriate state.

<Conversion Calculation Maps CMkt, CFpe Based on Approximate Polynomials>

Figure 5A:
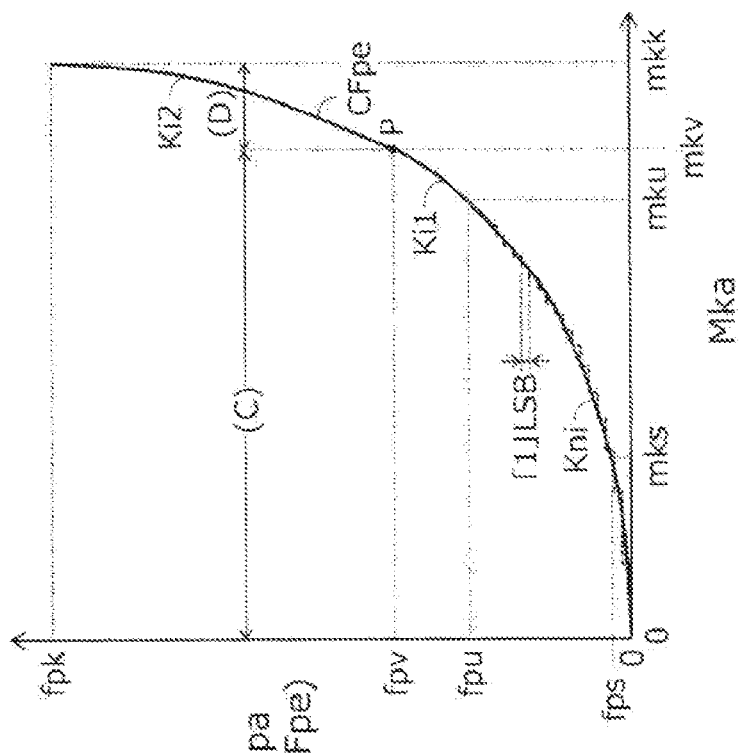
FIGS. 5A and 5B are characteristic diagrams for explaining creation of conversion calculation maps CMkt, CFpe.
Figure 5B:
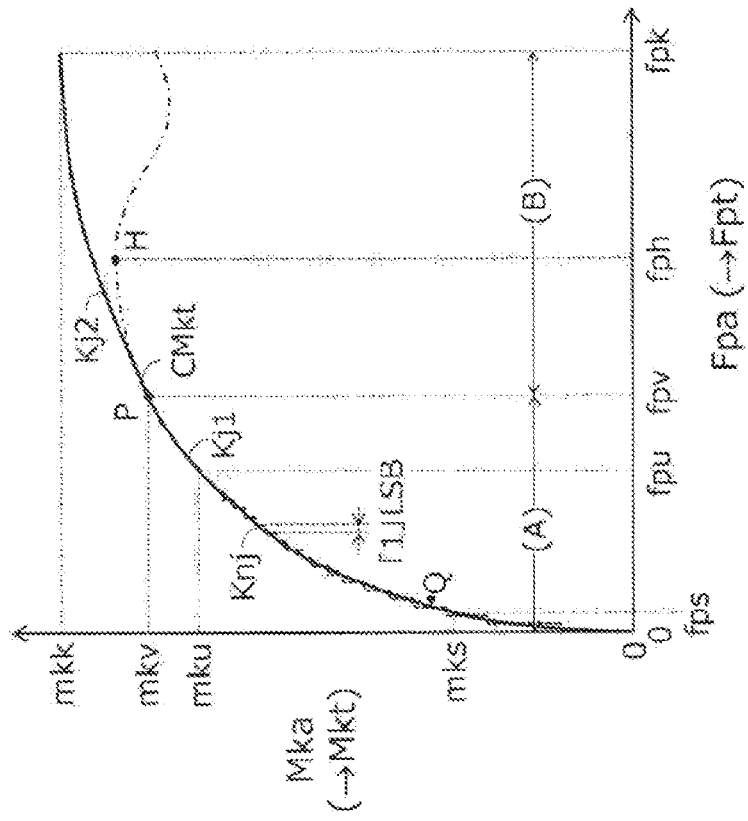

Processes in the approximation function calculation block KNJ in the conversion calculation block HNK will be described with reference to a characteristic diagram of FIGS. 5A, 5B. The approximation function calculation block KNJ stores the output value Fpa of the analog-digital conversion process block ADH and the detection value Mka of the rotation angle sensor MKA by synchronizing them. The conversion calculation map CMkt (Fpt-Mkt conversion characteristic) for the target rotation angle Mkt and the conversion calculation map CFpe (Mka-Fpe conversion characteristic) for the estimated pressing force Fpe are created based on the stored time series data (Fpa-Mka characteristic).

The conversion calculation maps CMkt, CFpe can be set as initial characteristics based on rigidities (spring constants) of the caliper CRP, the friction members MSB, and the like, and dimensions of the wheel cylinder WC and the pressurizing cylinder KCL (pressure receiving areas), and the like. However, the rigidity of the friction members MSB changes over time due to wear (the rigidity gradually increases). Due to this, in the conversion calculation maps CMkt, CFpe, the correlation of the actual pressing force Fpa and the actual rotation angle Mka is stored every time the series of braking operation takes place, and is successively updated based on the stored correlation (Fpa-Mka characteristic). Here, the "series of braking operation" refers to the start to the end of the braking operation.

The approximation function calculation block KNJ is formed in the conversion calculation block HNK. In the approximation function calculation block KNJ, the conversion calculation maps CMkt, CFpe are approximated and determined as functions Knj, Kni based on the actual pressing force Fpa and the actual rotation angle Mka. Specifically, the actual pressing force Fpa and the actual rotation angle Mka are measured in chronologic synchrony, and are stored as time series data set. With this data set, the actual rotation angle Mka with respect to the actual pressing force Fpa is approximated as the polynomial Knj having the second or higher degree by post-processing (that is, the processes after the series of braking operation from the start to the end of the braking operation). Similar to the approximation function Knj, the actual pressing force Fpa with respect to the actual rotation angle Mka is approximated as the polynomial Kni having the second or higher degree. Here, approximated relationships of the actual pressing force Fpa and the actual rotation angle Mka are called the "approximation functions Knj, Kni". The approximation functions Knj, Kni are in a relationship of inverse functions.

<<Conversion Calculation Map CMkt for Target Rotation Angle Mkt>>

Firstly, the conversion calculation map (target rotation angle map) CMkt for the target rotation angle Mkt will be described. Since the actual pressing force Fpa is inputted to the controller CTL after being subjected to the processes in the analog-digital conversion process block ADH, it is detected as a step-wise value for every "1 (unit)" LSB as shown by a broken line. Since the relationship of the actual pressing force Fpa and the actual rotation angle Mka is expressed as the polynomial approximation function Knj, the step-wise data generated by the LSB (being the least significant bit and the signal resolution) is interpolated.

Further, an influence of noise as shown by a point Q may be imposed on a detection signal. The influence of noise may be compensated by a filter. However, when a filter is used, the detection value is chronologically delayed, and it might become difficult to comply with a relatively fast braking operation. Since the stored data is smoothed by the approximation function Knj, the correlation of the actual pressing force Fpa and the actual rotation angle Mka can be acquired accurately even with a fast braking operation.

The approximation function Knj is set as a new conversion calculation map CMkt so that it may be used in subsequent and oncoming braking operations. The actual pressing force Fpa is replaced with the target pressing force Fpt and the actual rotation angle Mka is replaced with the target rotation angle Mkt, and an updated conversion calculation map CMkt is thereby determined. That is, the target rotation angle Mkt is set as a function map expressed in polynomial with the second or higher degree which uses the target pressing force Fpt as its variable and passes through the origin (that is, Mkt=0 when Fpt=0). In the conversion calculation map CMkt, the nonlinearity of the rigidities of the caliper CRP, the friction members MSB, and the like is taken into account, and the target rotation angle Mkt is increased with the "upwardly convex" characteristic relative to the increase in the target pressing force Fpt. As above, the approximation function Knj is calculated in the series of braking operation, and is successively updated as the conversion calculation map CMkt to be used in the subsequent braking operation, so a deviation in the calculation map caused by the chronological change in the friction members MSB may thereby be compensated. Further, since the conversion calculation map CMkt is set as the monotonically increasing function, a situation where the target rotation angle Mkt decreases despite the increase in the target pressing force Fpt may suitably be avoided.

In a case where a polynomial with the third or higher degree is to be employed as the approximation function Knj, as illustrated by a one-dot chain line, there may be a case where the target rotation angle Mkt does not increase monotonically with respect to the increase in the target pressing force Fpt (that is, there may be a case of including an inflection point H when Fpt=fph is established). To prevent the inflection point in the approximation function Knj and to set it as the "upwardly convex" monotonically increasing function, the approximation function Knj may be created using at least two functions (polynomials) Kj1, Kj2. Specifically, the approximation function Knj for the target rotation angle is approximated as a first approximation function Kj1 in a range A ($0 \leq Fpt < fpv$), and is approximated as a second approximation function Kj2 in a range B ($fpv \leq Fpt \leq fpk$). Here, the first approximation function Kj1 and the second approximation function Kj2 are continuous at a point P (Fpt=fpv, Mkt=mkv). Since the predetermined value fpv is a boundary between the first approximation function Kj1 and the second approximation function Kj2, it is termed a "boundary value".

Further, the degree of the first approximation function (first polynomial) Kj1 may be set larger than the degree of the second approximation function (second polynomial) Kj2. For example, in a case where the first approximation function Kj1 is a third-degree polynomial, the second approximation function Kj2 is set as a second-degree polynomial. This is because that in the rigidities (spring constants) of the caliper CRP, the friction members MSB, and the like, the spring constants are small and the nonlinearity thereof is strong in a case where the actual pressing force Fpa (that is, the target pressing force Fpt) is small, and the spring constants become larger and the nonlinearity thereof becomes weak (becomes closer to a linear profile) in a case where the actual pressing force Fpa is large.

The respective predetermined values (lower value fps, etc.) have the following relationship. The boundary value fpv is a value equal to or greater than the upper value fpu ($0 \leq fps \leq fpu \leq fpv$). Thus, the conversion characteristic in a region where the coefficients Kfp, Kmk gradually change (range of "Fpt<Fpu") is approximated by the first approximation function (first polynomial) Kj1. At the start of the actuation of the parking brake, the pressing force is increased not only for the constrained wheel but also for the free wheel as well (see FIG. 2). At this occasion, the actual pressing force Fpa is increased to a predetermined value fpk. Here, the predetermined value fpk is called the "requested value (of the parking brake)". The requested value fpk is set as a value greater than the boundary value fpv. With this parking brake actuation, the actual pressing force Fpa (that is, the target pressing force Fpt) is measured from "0" to the requested value fpk even for the free wheel not provided with the parking brake mechanism PKB and stored. Due to this, the high-precision conversion calculation map CMkt can be created. The conversion calculation map (target rotation angle map) CMkt for the target rotation angle has been described above.

<<Conversion Calculation Map CFpe for Estimated Pressing Force Fpe>>

Next, the conversion calculation map (estimated pressing force map) CFpe for the estimated pressing force Fpe will be described. Since the creation of the conversion calculation map CFpe is similar to the creation of the conversion calculation map CMkt, the description thereof will be given briefly. Similar to the conversion calculation map CMkt, the conversion calculation map CFpe also is determined based on the correlation (Fpa-Mka characteristic) of the actual pressing force Fpa and the actual rotation angle Mka. The conversion calculation map CFpe is created by the relationship of the actual pressing force Fpa with respect to the actual rotation angle Mka being determined, and the actual pressing force Fpa being replaced by the estimated pressing force Fpe.

In the creation of the conversion calculation map CFpe as well, the approximation function (approximate polynomial) Kni for the estimated pressing force may be employed. Here, the approximation function Kni is an inverse function of the approximation function Knj (a function obtained by switching an independent variable and a dependent variable of another function). That is, the estimated pressing force Fpe is set as a function map expressed in polynomial with the second or higher degree which uses the actual rotation angle Mka as its variable and passes through the origin (that is, Fpe=0 when Mka=0). In the conversion calculation map CFpe, the nonlinearity of the rigidities of the caliper CRP, the friction members MSB, and the like is taken into account, and the estimated pressing force Fpe is increased with a "downwardly convex" characteristic with respect to the increase in the actual rotation angle Mka.

To prevent an inflexion point in the approximation function Kni and to set it as a "downwardly convex" monotonically increasing function, the approximation function Kni may be created using at least two functions (polynomials) Ki1, Ki2. Specifically, the approximation function Kni is approximated as a first approximation function Ki1 in a range C (0≤Mka≤mkv), and is approximated as a second approximation function Ki2 in a range D (mkv≤Mka≤mpk). Here, the first approximation function Ki1 and the second approximation function Ki2 are continuous. Further, the degree of the first approximation function (first polynomial) Ki1 may be set larger than the degree of the second approximation function (second polynomial) Ki2. For example, in a case where the first approximation function Ki1 is a third-degree polynomial, the second approximation function Ki2 is set as a second-degree polynomial.

In the respective predetermined values (lower angle mks, etc.), the lower angle mks is a predetermined value corresponding to the lower value fps, the upper angle mku is a predetermined value corresponding to the upper value fpu, the boundary angle mkv is a predetermined value corresponding to the boundary value fpv, and the requested angle mkk is a predetermined value corresponding to the requested value fpk, respectively. Thus, there is a relationship of "0≤mks≤mku≤mkv<mkp".

Similar to the target rotation angle map CMkt, for the estimated pressing force map CFpe, the approximation function Kni is calculated in the series of braking operation, and is updated sequentially as the conversion calculation map CFpe for the subsequent braking operation. Due to this, deviations in the calculation map caused by chronological changes in the friction members MSB and the like may be compensated. Since the conversion calculation map CFpe is set as the monotonically increasing function, a situation where the estimated pressing force Fpe decreases despite the increase in the actual rotation angle Mka may suitably be avoided.

The pressing force generated by braking while traveling normally (so-called normal braking) is still not so large. On the other hand, the pressing force by the parking brake is set extremely larger than the case of the normal braking, by taking into account sloped roads and the like. Thus, the requested value (preset and predetermined value) fpk for the parking brake includes a range of the pressing force used in the normal braking. By the parking brake actuation, the actual pressing force Fpa is measured from "0" of the actual rotation angle Mka to the requested angle mkk by the parking brake and stored for the free wheel that is not provided with the lock mechanism PKB. As a result, the high-precision estimated pressing force map CFpe can be created. Due to this, even in the case where the pressing force sensor FPA is faulty, the estimated pressing force Fpe is calculated highly precisely based on the actual rotation angle Mka and the conversion calculation map CFpe, and the feedback control can be performed by the estimated pressing force Fpe (that is, the actual rotation angle Mka). The conversion calculation map (estimated pressing force map) CFpe for the estimated pressing force has been described above.

<Workings and Effects>

Workings and effects of the braking control devices BCS, BCR according to the present invention will be described with reference to time series graphs of FIGS. 6A, 6B. FIGS. 6A, 6B are a comparison of (a) the case where the appropriate state is determined for the pressing force sensor FPA and (b) the case where the inappropriate state is determined for the pressing force sensor FPA.

At a time point u0, the operation on the braking operation member BP is started by the driver, and at a time point u1, the braking operation amount Bpa exceeds the predetermined value bp0. Then, the braking operation amount Bpa is increased until a time point u4, and from the time point u4 and thereafter, the braking operation amount Bpa is maintained at the predetermined value bp1.

Firstly, the case where the appropriate state of the pressing force sensor FPA is determined will be described with reference to FIG. 6A. The target pressing force Fpt is increased based on the braking operation amount Bpa, as a result of which the actual pressing force Fpa and the estimated pressing force Fpe are increased. Since the target value and the actual value are controlled to match by the feedback control, lines of the target pressing force Fpt, the actual pressing force Fpa, and the estimated pressing force Fpe are overlapped.

As the braking operation amount Bpa increases, the target rotation angle Mkt is increased based on the target pressing force Fpt and the conversion calculation map CMkt (for example, the approximation function Knj), as a result of which the actual rotation angle Mka is increased. In a case where the target pressing force Fpt is increased linearly as time T elapses, the target rotation angle Mkt is increased in the "upwardly convex" profile as time T elapses due to the nonlinearity of the conversion calculation map CMkt. Similar to the case of the target pressing force Fpt, since the target value and the actual value are controlled to match by the feedback control, lines of the target rotation angle Mkt and the actual rotation angle Mka are overlapped.

The weighing coefficients Kfp, Kmk are determined based on the sequentially increased target pressing force Fpt (that is, the braking operation amount Bpa). Until a time point u2 when the target pressing force Fpt reaches the lower value fps, "Kfp=0, Kmk=1" are calculated. Under this condition, in the calculation of the composite compensation electric conduction amount Igh, only the rotation angle compensation electric conduction amount Imk is employed, and the pressing force compensation electric conduction amount Ifp is not employed. That is, only the feedback control based on the rotation angle Mka of the electric motor MTR is performed until the time point u2, and the output of the electric motor MTR is thereby adjusted.

In a case where an analog type sensor is employed as the pressing force sensor FPA, the actual pressing force Fpa is detected through the analog-digital conversion process block ADH. Due to this, the actual pressing force Fpa is affected by the resolution of the analog-digital conversion process. Especially, the influence of the resolution is prominent when the actual pressing force Fpa is small. However, in the region where the actual pressing force Fpa is small, only the actual rotation angle Mka is employed in the feedback control, by which the influence of the resolution can be suppressed. Further, since the rotation angle feedback control is performed based on the conversion calculation map CMkt that is updated each time the series of braking operation takes place, a highly precise braking control can be performed.

From the time point u2 to a time point u3, the pressing force coefficient Kfp is gradually increased from "0" to "1", and the rotation angle coefficient Kmk is gradually decreased from "1" to "0". Since the coefficients Kfp, Kmk are gradually changed according to the change in the target pressing force Fpt, an abrupt change in the state variables is not performed in the feedback control, and the switching can smoothly be performed.

At the time point u3 when the condition "Fpt≥fpu" is satisfied, "Kfp=1, Kmk=0" are calculated. Under this condition, in the calculation of the composite compensation electric conduction amount Igh, only the pressing force compensation electric conduction amount Ifp is employed and the rotation angle compensation electric conduction amount Imk is not employed. That is, from the time point u3 and thereafter, the feedback control based on the detection value Fpa of the pressing force sensor FPA is performed. This is because when the actual pressing force Fpa becomes relatively large, the influence of the resolution in the analog-digital conversion process becomes less influential to the control.

Next, the case where the inappropriate state of the pressing force sensor FPA is determined will be described with reference to FIG. 6B. Points that differ from the case of the "appropriate state" described with reference to FIG. 6A will mainly be described. Here, in the graph, the target pressing force Fpt and the estimated pressing force Fpe overlap, and the target rotation angle Mkt and the actual rotation angle Mka overlap.

The target pressing force Fpt is increased from the time point u1 when the braking operation amount Bpa has exceeded the predetermined value bp0. However, since the pressing force sensor FPA is faulty, the signal of the actual pressing force Fpa remains "0" (not outputted). At a time point uh when the deviation (comparison result) hFp of the actual pressing force Fpa and the estimated pressing force Fpe exceeds the predetermined threshold hfx, the appropriateness determination condition in step S150 is denied, and it is thereby determined as that "the pressing force sensor FPA is not in the appropriate state". Here, the threshold value hfx for the appropriateness determination is set to a value smaller than the lower value fps. Thus, the appropriateness determination of the pressing force sensor FPA is performed in the state of "Kfp=0, Kmk=1". Due to this, the signal Fpa of the faulty pressing force sensor FPA can be avoided from being employed in the feedback control.

Since the propriety state of the pressing force sensor FPA is determined based on the estimated pressing force map CFpe that is updated in each braking operation, sensor fault detection can surely be performed. Further, when "the pressing force sensor FPA not being in the appropriate state" is determined, the pressing force coefficient Kfp is determined as "0" according to the coefficient calculation map CKfn, and the rotation angle coefficient Kmk is determined as "1" according to the coefficient calculation map CKmn. That is, the pressing force feedback control is prohibited, only the rotation angle feedback control is executed, and the output of the electric motor MTR is thereby adjusted.

In the rotation angle feedback control, at the end of the series of braking operation, the target rotation angle Mkt is calculated based on the latest conversion calculation map CMkt approximated by the second or higher degree polynomial (function) Knj, and the electric motor MTR is controlled so that the target rotation angle Mkt and the actual rotation angle Mka match. Due to this, even in the case where the pressing force sensor FPA is in the inappropriate state, suitable braking control can be performed by the rotation angle feedback. The workings and effects of the braking control devices BCS, BCR according to the present invention have been described above.

In the embodiments, the configuration with the disk brake using the brake fluid pressure was exemplified. The drum brake may be employed instead of the disk brake. Further, the braking fluid pressure may not be used, and the configuration in which the friction members MSB are pressed against the rotating member KTB directly by the power transmission mechanism DDK may be employed. Same advantageous effects are achieved in this configuration as well.

The invention claimed is:

1. A braking control device for a vehicle configured to generate a pressing force for pressing a friction member against a rotating member fixed to a wheel of the vehicle via an electric motor controlled by a controller in accordance with an operation amount of a braking operation member of the vehicle, the braking control device comprising:
    a pressing force sensor configured to detect the pressing force for pressing the friction member against the rotating member as a pressing force actual value; and
    a rotation angle sensor configured to detect a rotation angle actual value of the electric motor;
    wherein the controller is configured to:
    determine whether or not an operating state of the pressing force sensor is appropriate;
    in a case of determining that the operating state of the pressing force sensor is appropriate, adjust an output of the electric motor based on the pressing force actual value, and store a correlation between the pressing force actual value and the rotation angle actual value, and create a conversion calculation map based on the correlation; and
    in a case of determining that the operating state of the pressing force sensor is not appropriate, adjust the output of the electric motor based on the rotation angle actual value and the conversion calculation map.

2. The braking control device for a vehicle according to claim 1, wherein the controller is configured to:
    calculate a pressing force estimation value based on the rotation angle actual value and the conversion calculation map; and
    determine whether or not the operating state of the pressing force sensor is appropriate based on a comparison result of the pressing force actual value and the pressing force estimation value.

* * * * *